(12) United States Patent
Oohashi

(10) Patent No.: US 7,527,252 B2
(45) Date of Patent: May 5, 2009

(54) SPRING SPACER FOR A SPRING

(75) Inventor: Satoshi Oohashi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 476 days.

(21) Appl. No.: 11/303,436

(22) Filed: Dec. 16, 2005

(65) Prior Publication Data

US 2006/0145403 A1    Jul. 6, 2006

(30) Foreign Application Priority Data

Dec. 16, 2004   (JP)   ............... 2004-364417
Apr. 1, 2005    (JP)   ............... 2005-106918

(51) Int. Cl.
*F16F 1/13*   (2006.01)
(52) U.S. Cl. .................. 267/170; 267/166
(58) Field of Classification Search ............ 267/166, 267/166.1, 167, 169, 170, 174, 178, 179, 267/287
See application file for complete search history.

(56) References Cited

U.S. PATENT DOCUMENTS

| | | | |
|---|---|---|---|
| 3,141,660 A * | 7/1964 | Clarke et al. ............... 267/166 |
| 4,475,725 A | 10/1984 | Niemann et al. |
| 4,614,333 A | 9/1986 | Gaylord et al. |
| 4,993,376 A | 2/1991 | Fukutome et al. |
| 5,464,198 A | 11/1995 | Yanko et al. ............... 267/167 |
| 5,678,809 A | 10/1997 | Nakagawa et al. .......... 267/148 |
| 5,722,645 A | 3/1998 | Reitter ...................... 267/177 |
| 5,911,295 A | 6/1999 | Itonaga et al. ............ 192/70.28 |
| 6,273,407 B1 | 8/2001 | Germano |
| 6,457,704 B1 | 10/2002 | Van Eerden et al. ......... 267/179 |
| 6,712,346 B2 | 3/2004 | Imaizumi .................... 267/286 |
| 6,869,067 B2 * | 3/2005 | Duval et al. ................. 267/220 |
| 7,213,067 B2 * | 5/2007 | Soga et al. .................. 267/167 |
| 7,392,977 B2 * | 7/2008 | Miyashiro et al. .......... 267/167 |
| 2002/0175488 A1 | 11/2002 | Brandt et al. ......... 280/124.179 |

FOREIGN PATENT DOCUMENTS

| | | | |
|---|---|---|---|
| GB | 2179423 | | 3/1987 |
| JP | 56046128 A | * | 4/1981 |
| JP | 02304228 A | * | 12/1990 |
| WO | WO 2004061325 A1 | * | 7/2004 |

OTHER PUBLICATIONS

European Search Report, Jan. 25, 2006.

* cited by examiner

*Primary Examiner*—Thomas J Williams
(74) *Attorney, Agent, or Firm*—Knobbe, Martens, Olson & Bear, LLP

(57) ABSTRACT

A spring spacer is provided to improve the durability of a spring, which is made of Ti or the like and low in surface hardness, by preventing abrasion With the spring spacer placed between a first turn and a second turn of a Ti spring, the spring spacer prevents an end of the first turn from contacting the second turn. The spring spacer includes a contact preventive portion that is interposed between the first turn and the second turn of the Ti spring to prevent the end of the first turn from contacting with the second turn. A holding portion holds the contact preventive portion on the spring or the spring bearing surface. The spring spacer can be used in a variety of applications, including on vehicle suspension springs, engine valve spring, and similar lightweight springs.

22 Claims, 34 Drawing Sheets

SPRING SPACER FOR A SPRING

RELATED APPLICATIONS

The present application is based on and claims priority under 35 U.S.C. § 119 to Japanese Patent Application No. 2005-106918, filed on Apr. 1, 2005; and Japanese Patent Application No. 2004-364417, filed Dec. 16, 2004, the entire contents of which are hereby expressly incorporated by reference herein.

BACKGROUND OF THE INVENTION

1. Field of the Invention

The present invention relates to a spring spacer for use with a spring of a suspension system for a vehicle. Preferably, the spring is made of a material such as Ti or the like, and has a low surface hardness.

2. Description of the Related Art

In recent years, motorcycles used for specific applications such as racing or the like utilize springs made of Titanium (Ti). Springs made of Ti are lightweight as compared to conventional springs made of Iron (Fe). For example, a suspension unit that has a Ti spring may weigh 200 to 500 g (by spring constant) less than a suspension unit that utilizes a conventional spring made of Fe.

While Ti springs are advantageously lightweight, they are prone to wear and have a lower durability due to their low surface hardness. Ti springs may have a hardness as low as Ti:Hv420 as compared with Fe:Hv550. Due to their low durability, Ti springs are often replaced after 1 or 2 races of a motorcycle.

In addition, Ti valve springs are utilized for engine intake and exhaust valves of vehicles. Since such Ti valve springs rapidly expand and contract at high speed, some valve springs are used with means to prevent contact and abrasion between a first turn and a second turn of the spring. For example, U.S. Pat. Specification No. 4,993,376 proposes a spring unit, in which an end of a first turn of a Ti valve spring is insert-molded in a spring seat made of a synthetic resin in order to prevent abutment between the end of the first turn of the valve spring and the second turn.

The spring seats are cylindrically-shaped and have an annular flange integrally molded to one end edge. Spring seats are fitted onto both ends of the valve spring. One of the spring seats abuts against a spring retainer and is held by a spring bearing surface (indicates a surface that bears a load of the spring) of the spring retainer. The other spring seat abuts a cylinder head and is held by a spring bearing surface or annular flat surface on the cylinder head, through a washer-shaped spring seat.

With such construction, the end of the first turn of the valve spring is insert-molded in the spring seat made of a synthetic resin. Abutment between the end of the first turn of the valve spring and the second turn is prevented, which prevents contact abrasion of the second turn.

Also, another disclosed embodiment of the spring unit has a shoulder surface comprising a circumferentially inclined surface bearing an end of the valve spring is provided on the spring seat and is made integral therewith. With such construction, the shoulder surface is interposed between the end of the first turn and the second turn of the valve spring to prevent contact abrasion of the second turn.

While the spring seat is intended for a valve spring unit of an internal combustion engine, the spring seat may also be utilized in a unit, such as a vehicular suspension unit having a large spring. A suspension spring having a large diameter wire involves a larger individual dispersion at both spring ends as compared with the valve spring. Therefore, there is a need for clearance to accommodate the individual dispersion between the shoulder surface and the second turn by lowering the shoulder surface interposed between an end of a first turn and a second turn of the suspension spring.

However, the clearance may permit the spring seat to rotate during assembly of the suspension unit and cause movement of the shoulder surface relative to the suspension spring. This relative movement may allow contact between the first and second turns of the spring.

A worker may deliberately prevent this rotation of the spring seat at the time of assembling the suspension unit. However, this additional step may decrease productivity.

Also, in this case, several kinds of spring seats may be formed with shoulder surfaces of different heights. The spring seats are selectively matched and assembled with springs taken into account each springs dispersion. However, this matching process of temporarily mounting the different height spring seats with each spring and selecting an optimum spring seat for the spring may decrease productivity.

On the other hand, in the case where an end of a first turn of a suspension spring is insert-molded in a spring seat made of a synthetic resin, the problem described above is overcome but the molding process of the spring seat in a large-sized suspension spring is complex and may decrease productivity.

SUMMARY OF THE INVENTION

An aspect of the present invention is directed toward addressing one or more of these problems and provide a spring spacer having a simple structure that prevents contact between an end of a first turn and a second turn of a spring. Preferably, the spring is made of a material having a low surface hardness, such as Ti or the like. A spring spacer, which is configured in accordance with the embodiments disclosed herein, improves the durability of the spring and is easily mounted to the spring so as to improve productivity.

Another aspect of the present invention involves a spring spacer comprising a contact preventive portion that prevents an end of a first turn of a spring, of which both ends are held on spring bearing surfaces, from contacting with a second turn. A holding portion holds the contact preventive portion on the spring or the spring bearing surface. The holding portion is sized so as not to contact both the spring and the spring bearing surface at least when the spring is un-contracted.

The contact preventive portion can be located between the first turn and the second turn of the spring and prevents the end of the first turn from contacting the second turn. The contact preventive portion can also be located between the spring bearing surface and the spring to prevent the end of the first turn from contacting the second turn.

In certain embodiments, the spring spacer includes a first contact preventive portion interposed between the first turn and the second turn of the spring to prevent the end of the first turn from contacting the second turn, and a second contact preventive portion interposed between the spring bearing surface and the spring to prevent the end of the first turn from contacting the second turn.

The spring spacer can include a contact preventive portion interposed between the first turn and the second turn of the spring to prevent the end of the first turn from contacting with the second turn, and a latch interposed between the spring bearing surface and the spring to prevent the contact preventive portion from moving along the spring.

In certain embodiments, the spring spacer includes a contact preventive portion interposed between the first turn and the second turn of the spring to prevent the end of the first turn from contacting with the second turn, and a latch interposed between the spring bearing surface and the spring to prevent the contact preventive portion from moving along the spring. The latch including a one or two piece member susceptible to deformation upon application of a load from above.

In certain embodiments, the spring spacer includes the thickness of the contact preventive portion is made larger than a dimension of that clearance between the first turn and the second turn of the spring, in which the contact preventive portion is mounted, the holding portion includes latch grooves, which are formed on two surfaces of the contact preventive portion, respectively, and arcuate in cross section to correspond to outer peripheral surfaces of the first turn and the second turn of the spring, and the contact preventive portion is press fitted and held between the first turn and the second turn of the spring.

In certain embodiments, the thickness of the contact preventive portion is made smaller than a dimension of that clearance between the first turn and the second turn of the spring, in which the contact preventive portion is mounted. Also, in certain embodiments, the thickness of the contact preventive portion is made smaller than a dimension of that clearance between the first turn and the second turn of the spring, in which the contact preventive portion is mounted, and that portion of the contact preventive portion, which corresponds to the end of the first turn, is made smaller in thickness than the remaining portion.

In certain embodiments, the holding portion includes an abutment piece formed on one side of the contact preventive portion to abut against at least an inner peripheral surface of the second turn of the spring and the abutment piece is caused to abut against an outer peripheral surface of a cylindrical-shaped member inserted into the spring to thereby hold the contact preventive portion between the first turn and the second turn of the spring, or between the spring bearing surface and the spring.

In certain embodiments, the holding portion includes an elastic engagement piece provided on the contact preventive portion and the spring is held by the elastic engagement piece to hold the contact preventive portion between the first turn and the second turn of the spring, or between the spring bearing surface and the spring. Also, preferably, the holding portion includes an adhesive to bond and fix the contact preventive portion to the spring bearing surface to hold the same between the spring bearing surface and the spring.

In certain embodiments, the holding portion includes an engagement projection provided on the contact preventive portion and the contact preventive portion is held between the spring bearing surface and the spring by engaging the engagement projection with an engagement hole formed on the spring bearing surface.

In certain embodiments, the contact preventive portion is arcuate to have substantially the same radius of curvature as that of the second turn of the spring. Also, preferably, the contact preventive portion is made lengthy to interpose between the first turn and the second turn of the spring even in the case where the contact preventive portion is moved along the spring, thus preventing the end of the first turn from contacting with the second turn.

Certain embodiments provide a spring having any one of the above spring spacers interposed between the first turn and the second turn, or between the spring bearing surface and the second turn, or between the both.

Certain embodiments provide a suspension spring having any one of the above spring spacers interposed between the first turn and the second turn, or between the spring bearing surface and the second turn, or between the both.

Certain embodiments provide a unit having any one of the spring spacers interposed between the first turn and the second turn of a spring, or between the spring guide and the second turn, or between the both.

Certain embodiments provide a suspension unit having any one of the above spring spacers interposed between the first turn and the second turn of a suspension spring, or between the spring guide and the second turn, or between the both.

Certain embodiments provide a vehicle having any one of the above spring spacers interposed between the first turn and the second turn of a suspension spring, or between the spring guide and the second turn, or between the both.

In certain embodiments, the spring spacer is a simple structure that prevents contact between an end of a first turn and a second turn of a spring, which may be Ti or the like having a low surface hardness, to enable achieving an improvement in durability.

In certain embodiments, the holding portion has a shape so as not to contact the spring bearing surface and the spring all the time. The spring spacer can be mounted to the spring during initial assembly or retrofitted to the spring by press fitting or engagement so as to improve manufacturing productivity.

Accordingly, when the spring spacer is used for a spring that forms various units, or a suspension spring that forms a suspension unit of a vehicle, it is possible to prevent contact abrasion to a second turn of the spring, the suspension spring, the unit, the suspension unit, and the vehicle, and to also improve productivity.

The systems and methods of the invention have several features, no single one of which is solely responsible for its desirable attributes. Without limiting the scope of the invention as expressed by the claims which follow, its more prominent features have been discussed briefly above. After considering this discussion, and particularly after reading the section entitled "Detailed Description of the Preferred Embodiment" one will understand how the features of the system and methods provide several advantages over traditional suspension systems.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

Figure 19:
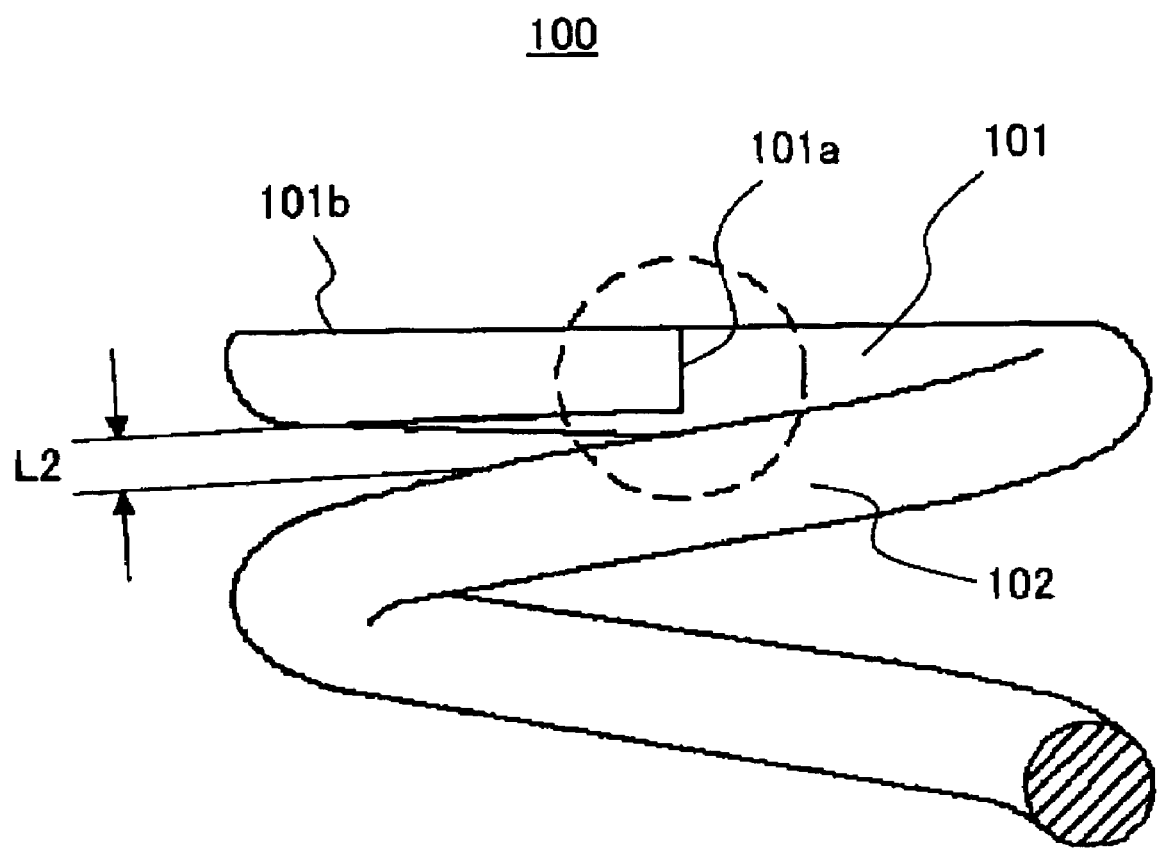
FIG. 19 is a partially enlarged view of an upper portion of a spring.

Before describing several embodiments of the present spring spacer, a problem address by at least some of the following embodiments will first be described in connection with the spring illustrated in FIG. 19. FIG. 19 is a partially enlarged view of an upper portion of a spring 100. The spring 100 is made of a material such as Ti or the like, and has a low surface hardness. The spring 100 has a terminal cut portion 101a and a cut flat surface 101b formed on a first turn 101 of the spring 100. The terminal cut portion 101a has a sharp edge at a periphery thereof, so that each time the spring 100 contracts and expands the terminal cut portion 101a abuts against a second turn 102 and scrapes the second turn 102. A spring spacer, which is confirmed in accordance with at least some of the following embodiment, inhibits scraping between the first and second turns of the spring.

The following detailed description is now directed to certain specific embodiments of the invention. However, the invention can be embodied in a multitude of different systems and methods. In this description, reference is made to the drawings wherein like parts are designated with like numerals throughout.

A spring spacer, a suspension spring, a suspension unit, and a vehicle according to a first embodiment of the invention will be described with reference to the drawings. An embodiment of a suspension unit and a vehicle, in which the present spring spacer is provided for a suspension spring, will be described with reference to FIG. 1.

Figure 1:
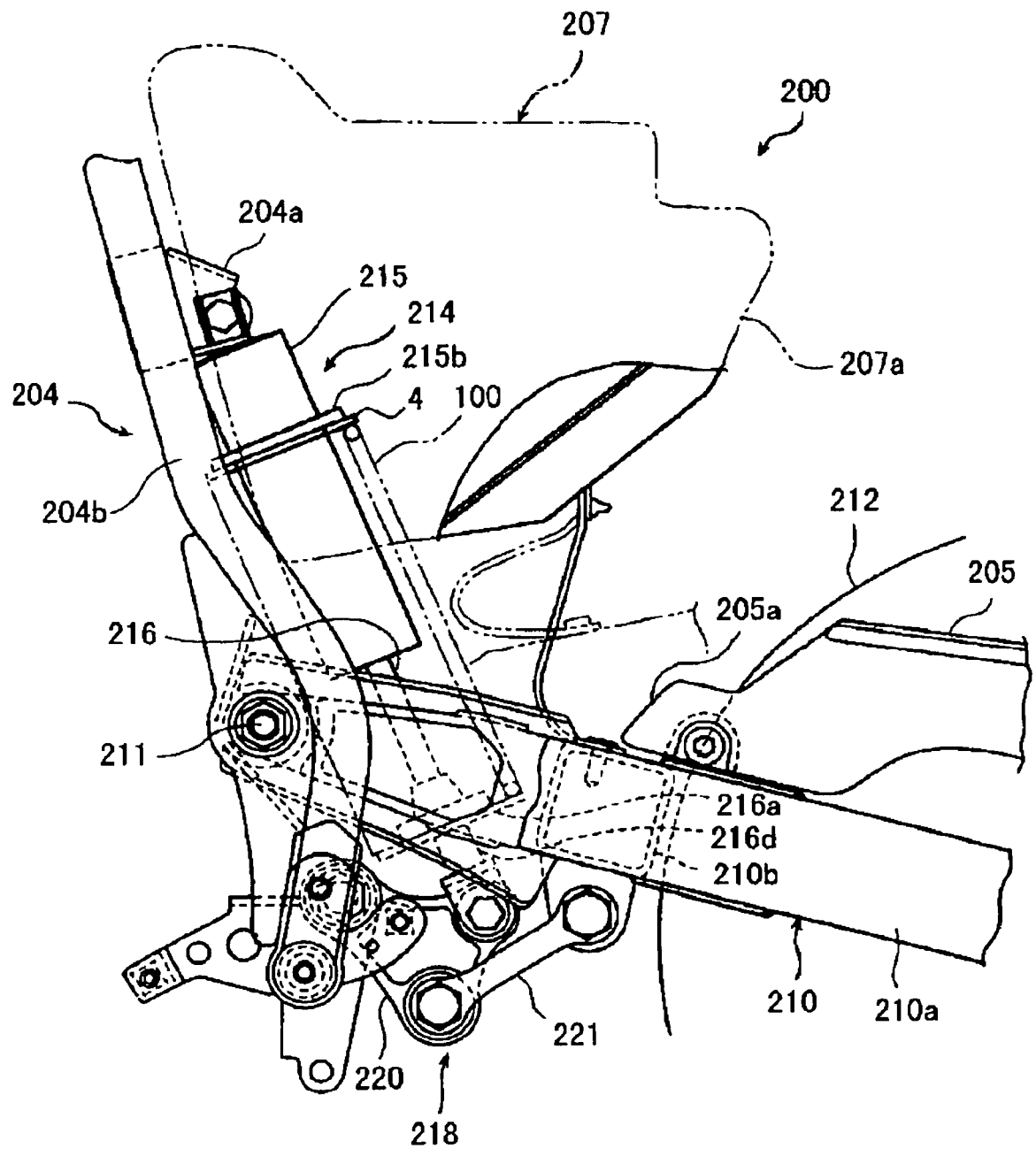
FIG. 1 is a side view of a suspension unit of an off-road type motorcycle, the suspension unit including one or more spring spacers that are configured in accordance with a preferred embodiment of the present invention.
Figure 2A:
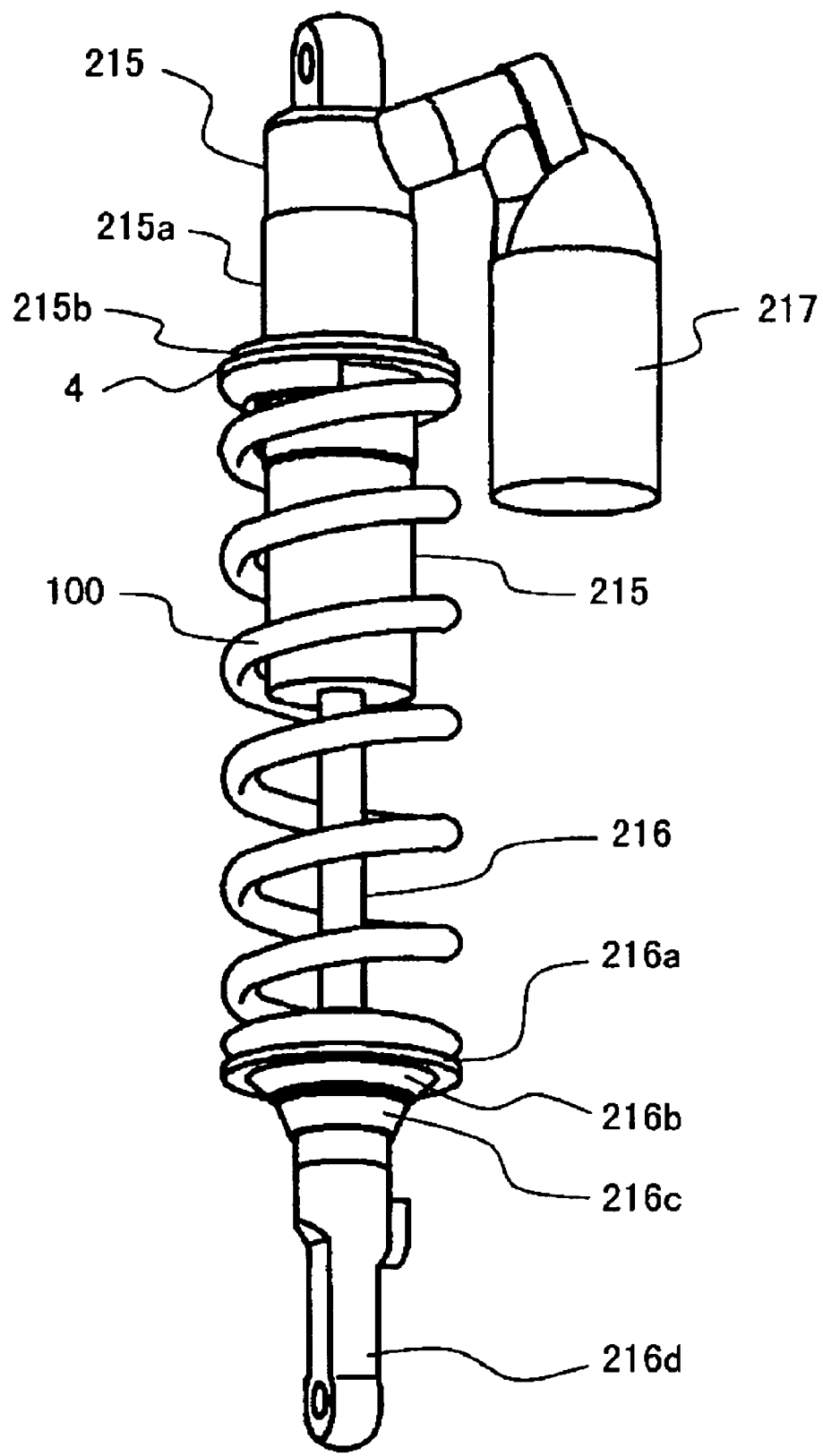
FIG. 2A is a perspective view of the suspension unit from FIG. 1 in an assembled state.
Figure 2B:
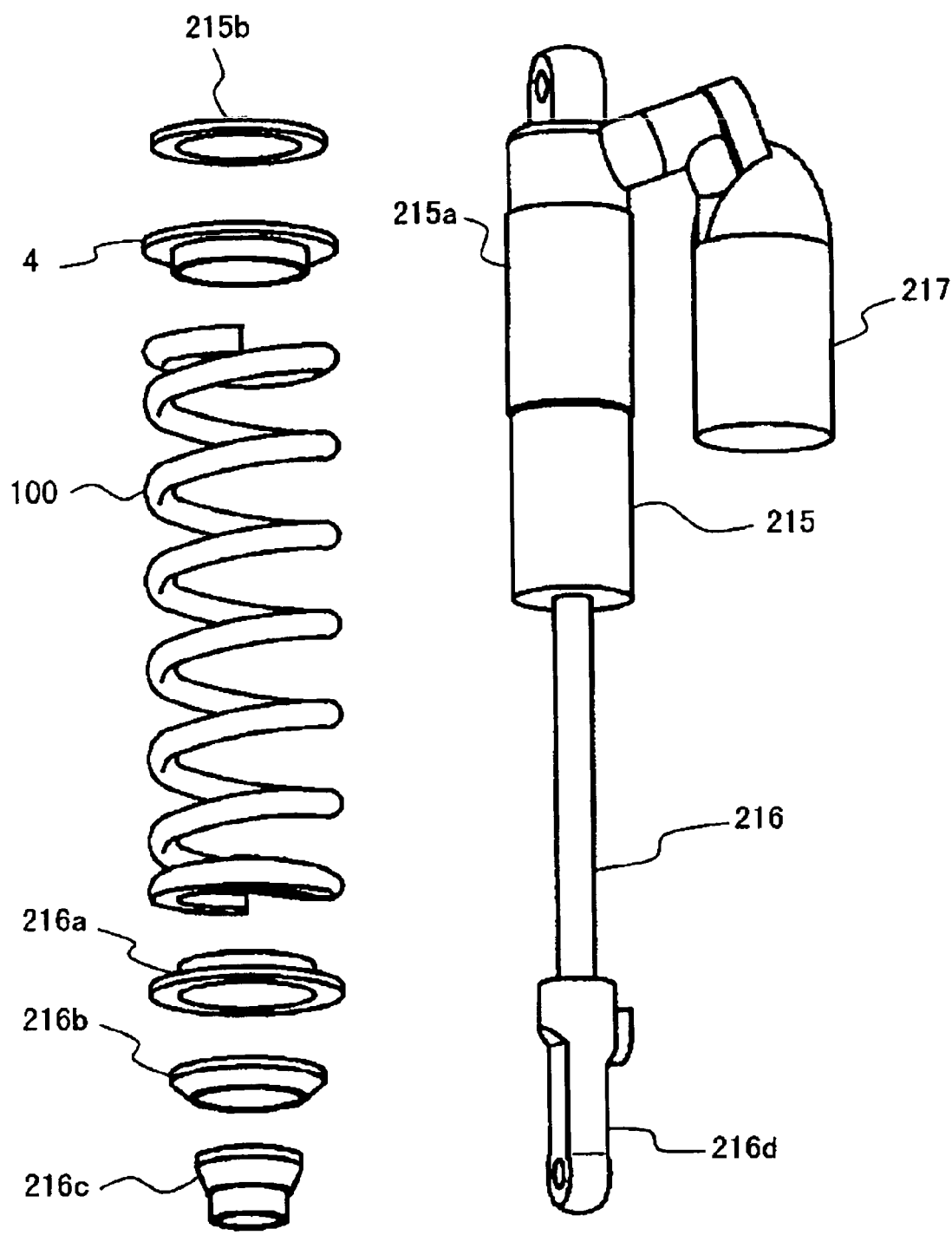
FIG. 2B is an exploded, perspective view of the suspension unit from FIG. 2A.
Figure 2C:
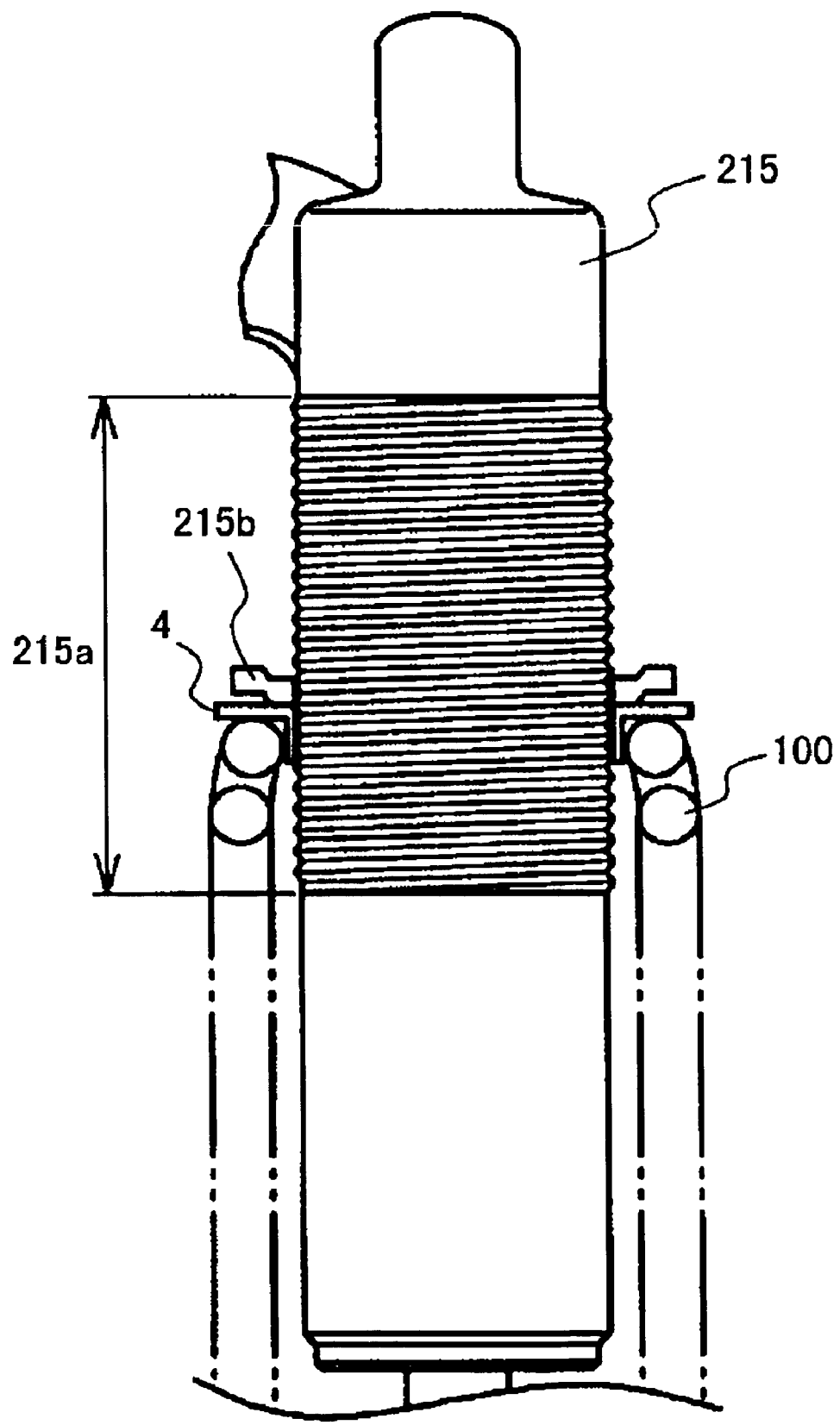
FIG. 2C is a partially, enlarged view of an upper portion of the suspension unit from FIG. 2A.

FIG. 1 is a side view of a suspension unit of a vehicle or an off-road type motorcycle according to an embodiment of the invention. FIGS. 2A through 2C show a suspension unit according to an embodiment of the invention. FIG. 2A is a perspective view of the suspension unit from FIG. 1 in an assembled state. FIG. 2B is an exploded, perspective view of the suspension unit from FIG. 2A. FIG. 2C is a partially, enlarged view of an upper portion of the suspension unit from FIG. 2A.

In FIG. 1, the reference numeral 200 denotes a rear arm support of a vehicle such as an off-road type motorcycle. A vehicle frame 204 includes a rear arm bracket 204b arranged obliquely to the vehicle and in a downward direction from the vehicle frame 204. The rear arm bracket 204b diverges and extends vertically. An air cleaner 207 is arranged in a space surrounded by a seat, left and right seat rails, and left and right seat stays, which are not shown. The air cleaner 207 includes an air cleaner casing 207a. Within the air cleaner casing 207a is a filtration element for filtering air.

A pivot shaft 211 on a rear and lower end of the rear arm bracket 204b pivotally supports a rear arm 210 that freely swings up and down. A rear wheel 212 is journaled on a rear end of the rear arm 210. The rear arm 210 connects to a square-shaped cross pipe 210b located between the front ends of left and right arm portions 210a, 210a. The cross pipe 210b is positioned close to the rear wheel 212 so as to leave minimum clearance between it and a front edge of the rear wheel and provide a shorter wheelbase and strength and rigidity to the whole rear arm 210.

Also, a chain casing 205 covering an upper portion of a drive chain is arranged on the left arm portion 210a. A front edge 205a of the chain casing 205 is positioned on an upper surface of the cross pipe 210b.

A single inverted type suspension unit 214 is arranged between the vehicle frame 204 and the rear arm 210 and on a center line of the vehicle. The suspension unit 214 comprises a cylinder 215, a piston rod 216, a reservoir tank 217 (see FIG. 2A), a spring 100, and a linkage 218.

The cylinder 215 is connected to a bracket 204a on a rear, upper end of the rear arm bracket 204b as shown in FIG. 1. Also, as shown in FIGS. 2A to 2C, the cylinder 215 includes a male thread 215a on an outer peripheral surface toward an upper end thereof, a lock nut 215b, and a spring guide 4. The lock nut 215b and the spring guide 4 are threaded on the male thread 215a.

Figure 10A:
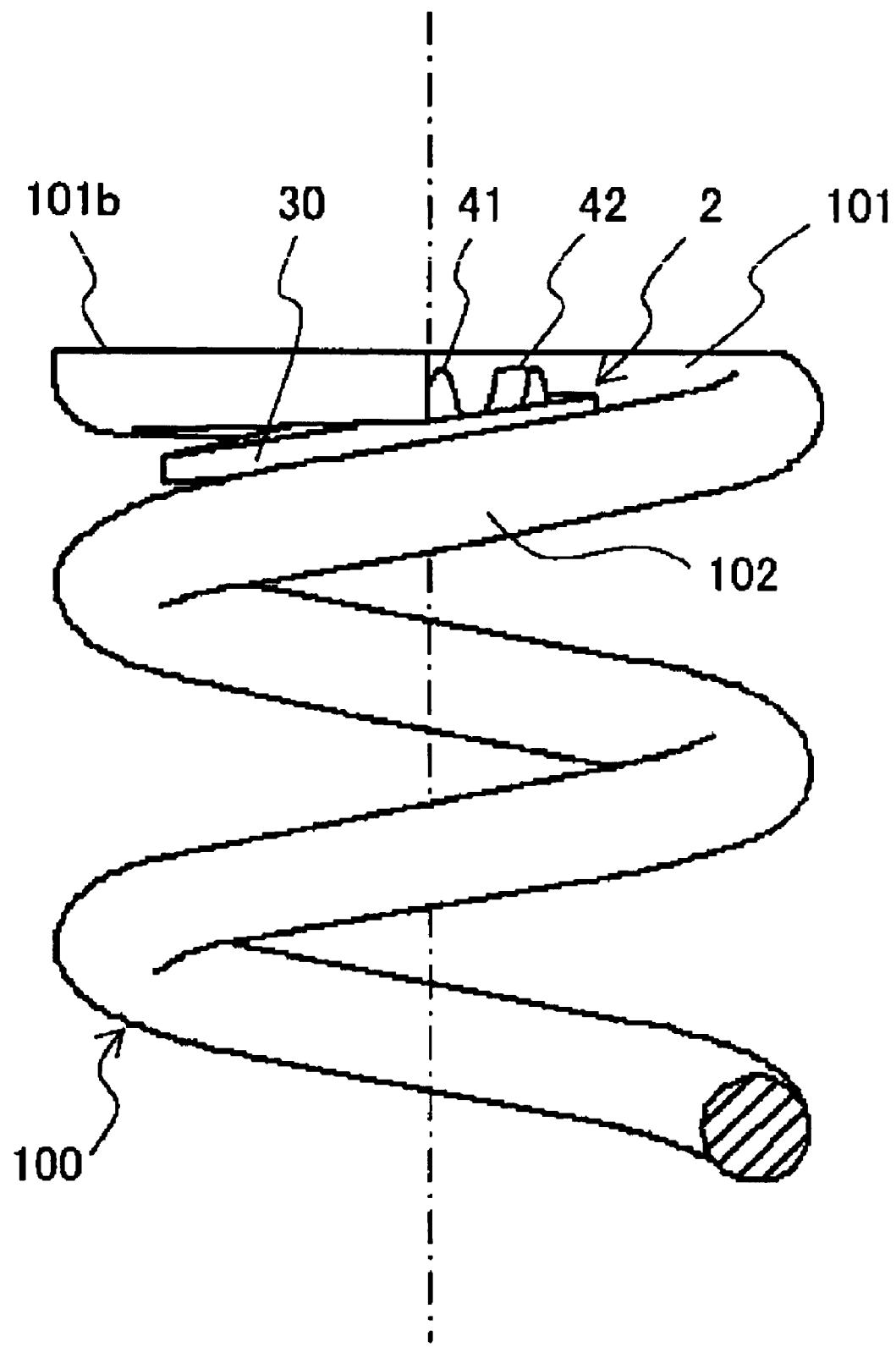
FIG. 10A is a front view of the spring spacer in the mounted position illustrated in FIG. 8B.
Figure 10B:
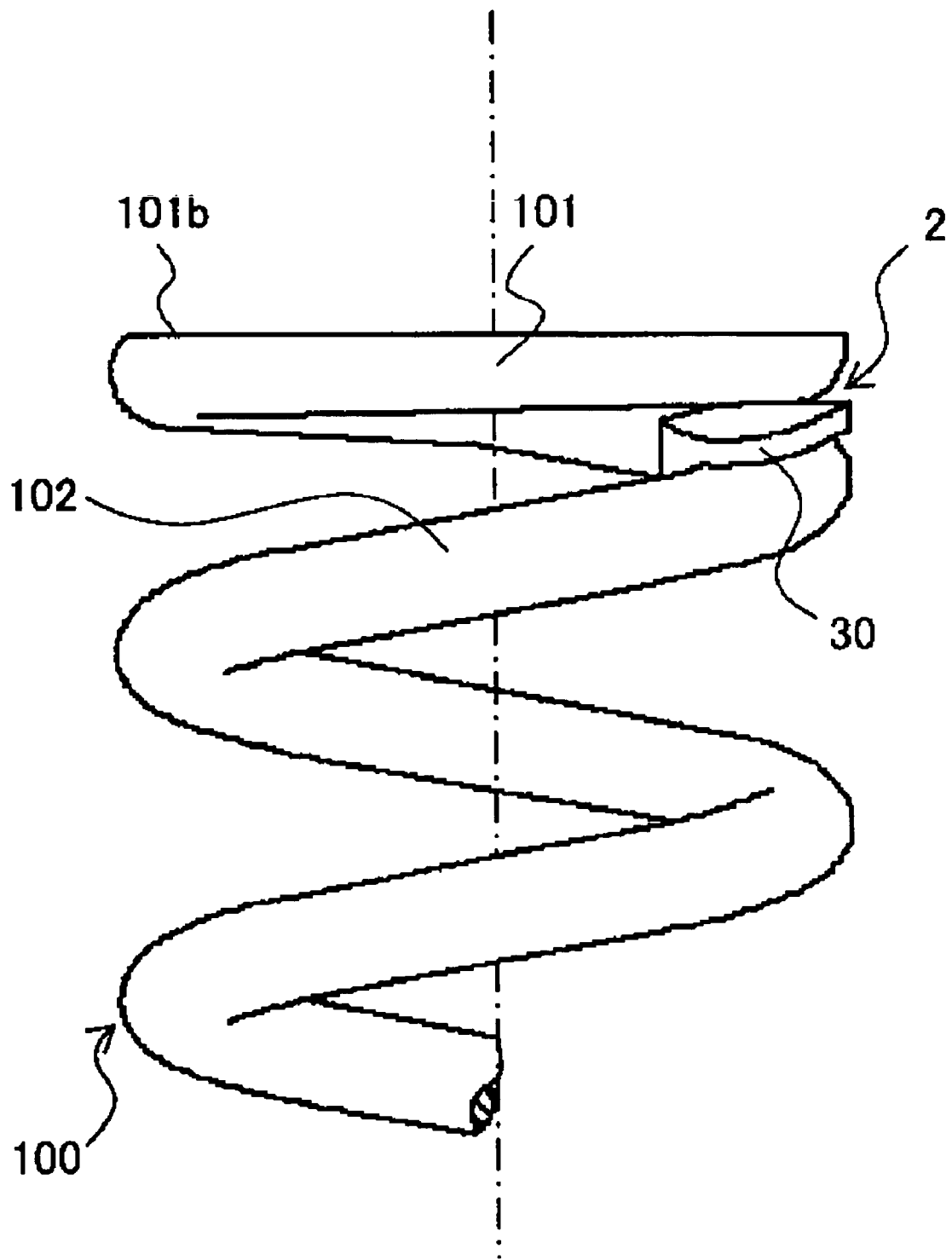
FIG. 10B is a left side view of the spring spacer in the mounted position illustrated in FIG. 8B.
Figure 10C:
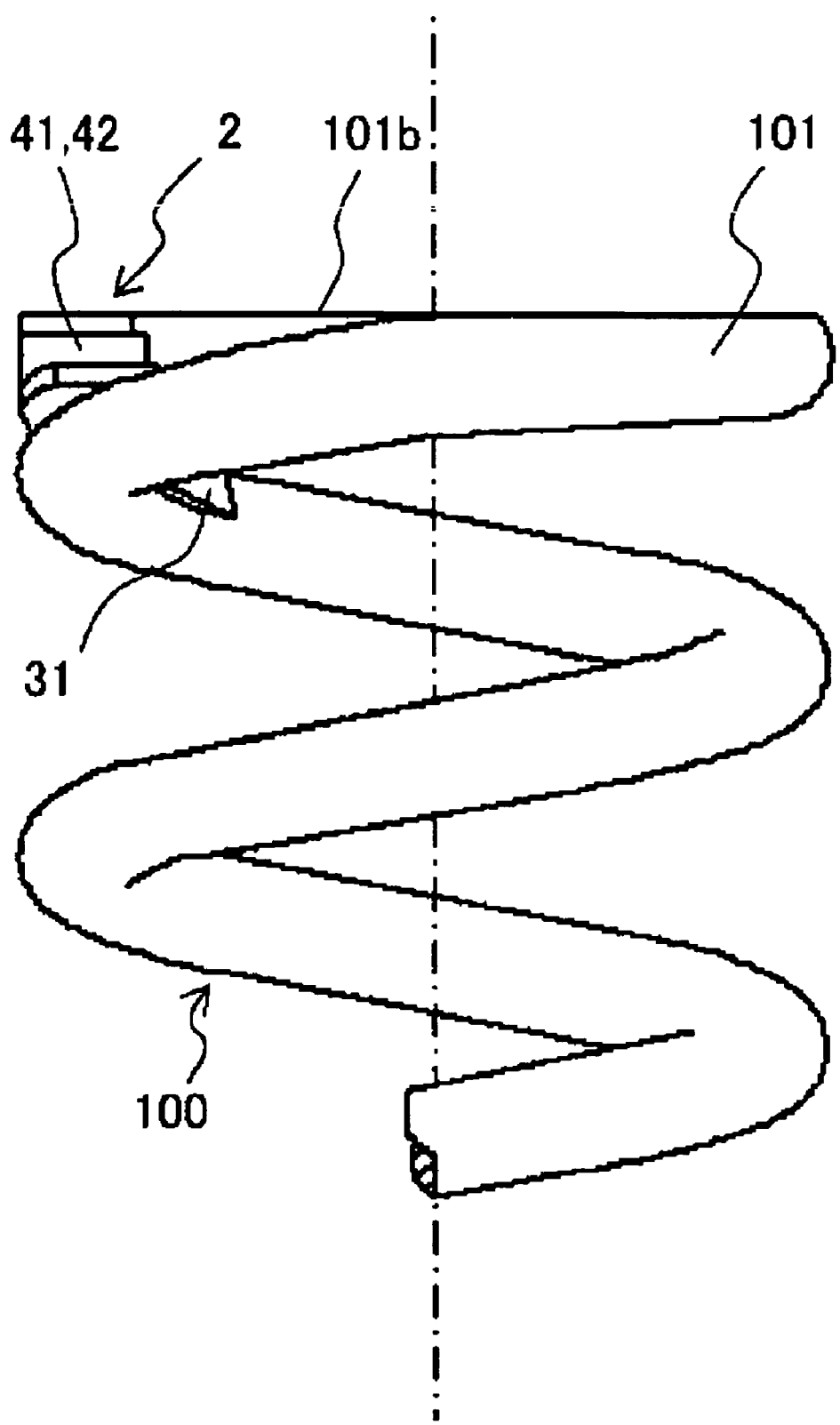
FIG. 10C is a right side view of the spring spacer in the mounted position illustrated in FIG. 8B.
Figure 10D:
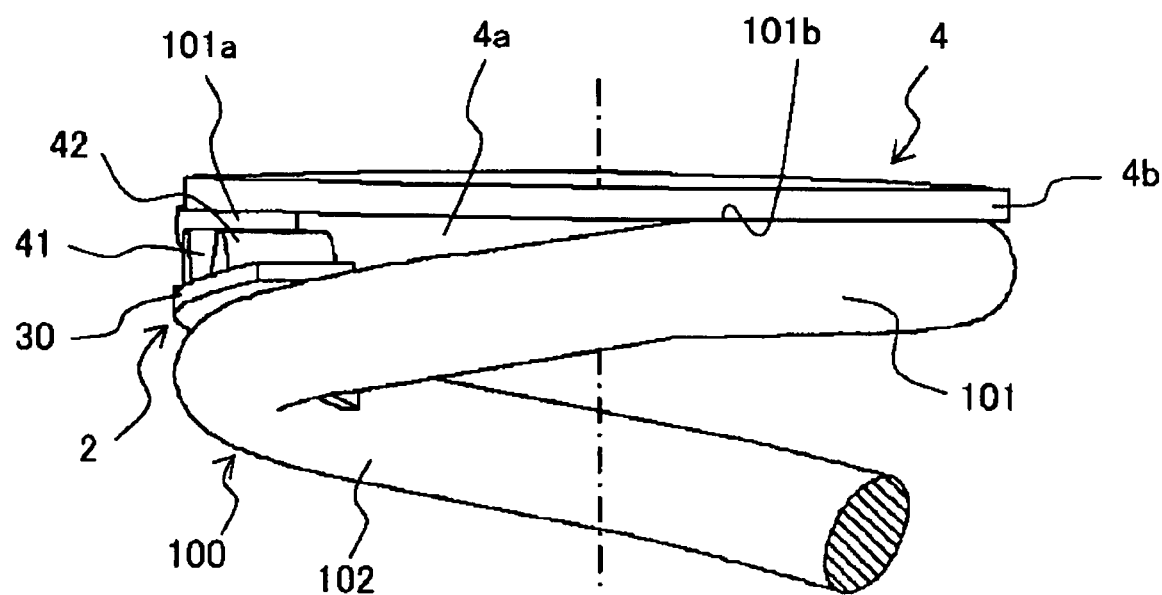
FIG. 10D is an enlarged view of the spring spacer and an upper portion of the spring from FIG. 10C.

The spring guide 4 includes a metallic member having a cylindrical-shaped trunk portion (cylindrical-shaped member) 4a and flange portion 4b (see FIG. 10D). The flange portion 4b bears a load of the spring 100 and is integral with the trunk portion 4a. The trunk portion 4a is on an inside of the spring guide 4 thereof with a female thread (not shown), which is threaded on the male thread 215a of the cylinder 215. The spring guide 4 is threaded on the male thread 215a to bear a load of the Ti spring 100 (for example, a load of 7500 N at the time of off-road traveling). In addition, that surface of the flange portion 4b, which abuts against the Ti spring 100, corresponds to "spring bearing surface".

The piston rod 216 is connected to a piston (not shown) slidably inserted into the cylinder 215 and projects downward from the cylinder 215. Mounted to a lower end of the piston rod 216 are a metallic spring guide 216a that pairs with the spring guide 4, load bearing members 216b, 216c that support the metallic spring guide 216a, and a link portion 216d.

The reservoir tank 217 is communicated to an interior of the cylinder 215 via a pressure oil flow passage (not shown) to accommodate an increase and a decrease in pressure oil volume in the cylinder 215 when the piston rod 216 extends and contracts.

The Ti spring 100 is exteriorly mounted to the cylinder 215 and the piston rod 216 and held by the pair of the upper and lower spring guides 4, 216a. The bias of the Ti spring 100 can be regulated by varying a position, in which the lock nut 215b and the spring guide 4 are clamped together. Mounted to the Ti spring 100 is a spring spacer 1 (see FIG. 3), according to the embodiment, described later.

The linkage 218 includes, as shown in FIG. 1, a pair of left and right first links 220 pivotally mounted to a lower end of the rear arm bracket 204b and a second link 221 pivotally mounted to a lower surface of the cross pipe 210b. The piston rod 216 is connected to the rear arm 210 by connecting the link portion 216d of the piston rod 216 to the first links 220 of the linkage 218.

Figure 3:
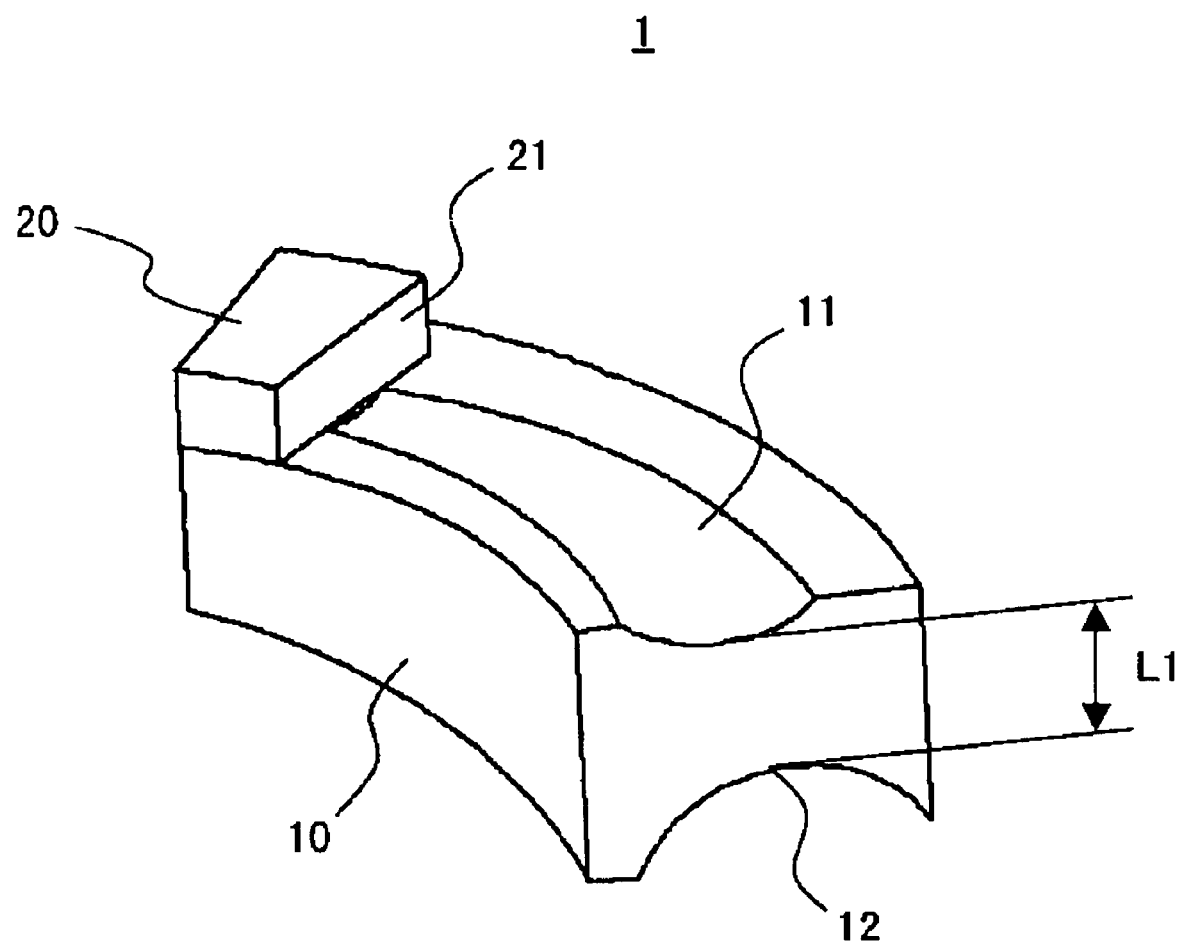
FIG. 3 is a perspective view showing a spring spacer according to a first embodiment and for use with the suspension unit illustrated in FIG. 2A.

Subsequently, the spring spacer according to the first embodiment of the invention will be described with reference to the drawings. FIG. 3 is a perspective view showing the spring spacer according to the first embodiment of the invention.

In the figure, the spring spacer 1 according to the embodiment is interposed in a clearance L2 between a first turn 101 and a second turn 102 of the Ti spring 100 shown in FIGS. 1 and 19 to prevent an end 101a of the first turn 101 from contacting with the second turn 102. The spring spacer 1 is made separate from and independent of the metallic spring guide and is molded from hard rubber to form a contact preventive portion (first contact preventive portion) 10 and a latch (second contact preventive portion) 20 integrally.

The contact preventive portion 10 is arcuate to have substantially the same radius of curvature as that of the first turn 101 and the second turn 102 of the Ti spring 100. The contact preventive portion 10 is formed on upper and lower surfaces thereof, respectively, with latch grooves (holding portions) 11, 12, which are arcuate in cross section to correspond to outer peripheral surfaces of the first turn 101 and the second turn 102 of the Ti spring 100.

Also, the contact preventive portion 10 is small in thickness on that tip end side thereof, on which the latch 20 is provided, and large in thickness on a rear end side thereof (see FIG. 4C), and a central portion of the latch grooves 11, 12 on the rear end side has a larger thickness L1 than that of the clearance L2 between the first turn 101 and the second turn 102 of the Ti spring 100. As a result, by press fitting and mounting the contact preventive portion 10 into the clearance L2 between the first turn 101 and the second turn 102 of the Ti spring 100, the contact preventive portion 10 is exerted by the bias of the first turn 101 and the second turn 102 of the Ti spring 100, so that the spring spacer 1 is held in the clearance L2.

On the other hand, the latch 20 is in the form of a rectangular-shaped block projection to include an abutment surface 21 facing toward the latch groove 11 on the upper surface of the contact preventive portion 10. When mounted to the Ti spring 100, the latch 20 has the abutment surface 21 abutting against the end 101a of the first turn 101 to prevent the spring spacer 1 from moving toward the second turn 102 (see FIG. 4C).

In addition, for example, in the case where a spring guide 4 shown in FIG. 10D is mounted on the cut flat surface 101b of the first turn 101 of the Ti spring 100, a space toward the first turn 101 is narrowed heightwise, so that movement of the spring spacer 1 toward the first turn 101 is prevented by the latch 20.

Also, the latch 20 is interposed between the spring guide 4 and the second turn 102 of the Ti spring 100 to serve as the second contact preventive portion that prevents the end 101a of the first turn 101 from contacting with the second turn 102.

Here, an explanation is given to a material that forms the spring spacer 1. Demanded of a material of the spring spacer 1 are properties, such as antifriction, owing to which the spring spacer does not undergo abrasion easily even when subjected to vibrations in a state of being interposed between the first turn 101 and the second turn 102 of the Ti spring 100, and elasticity capable of accommodating an error in the case where the clearance L2 between the first turn 101 and the second turn 102 is smaller than a predetermined value. For example, according to the embodiment, sufficient antifriction, hardness, and elasticity could be obtained when the spring spacer 1 was experimentally manufactured by hard rubber that forms a chain slider generally used as a part for motorcycles.

Figure 4A:
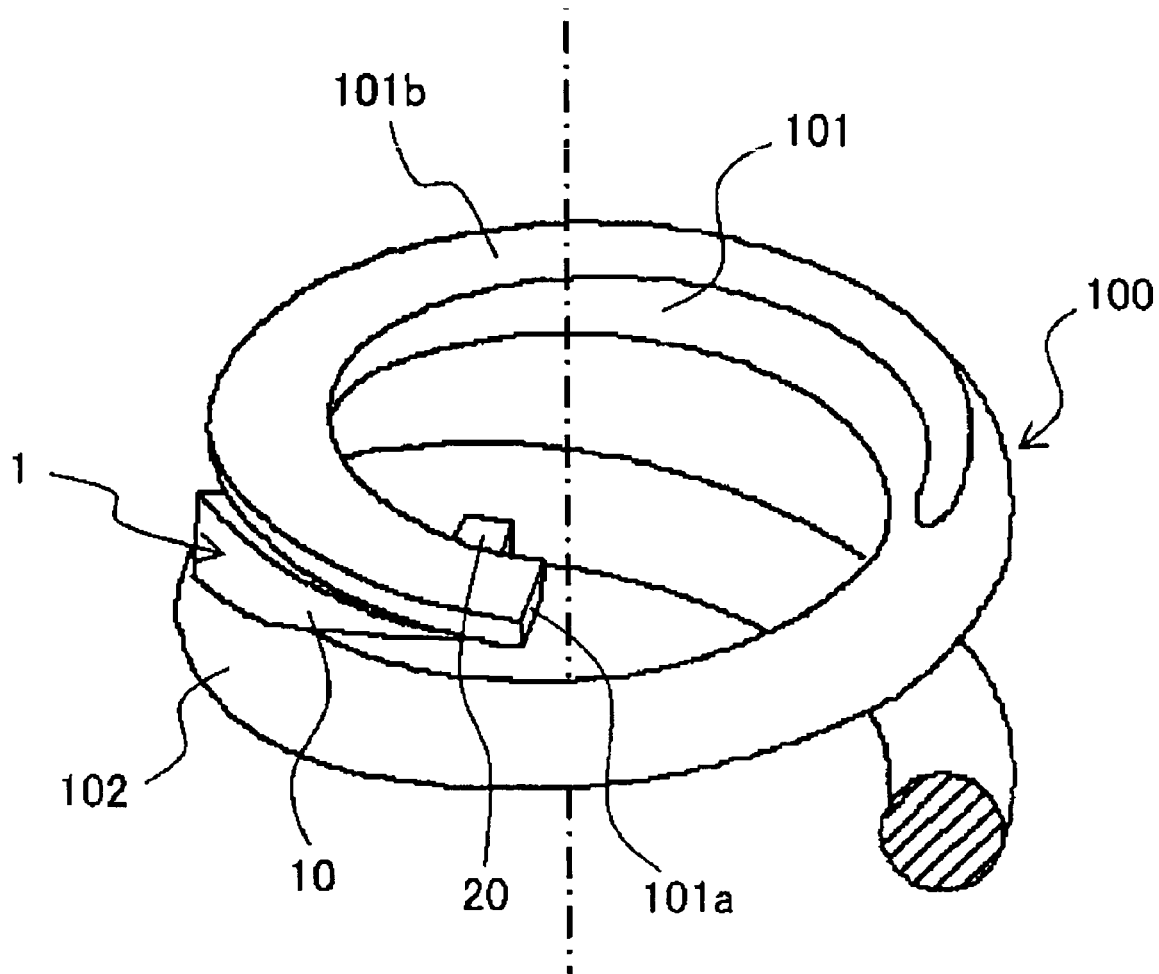
FIG. 4A is a perspective view of the spring spacer in a first interim position and between a first turn and a second turn of the spring illustrated in FIG. 2B.
Figure 4B:
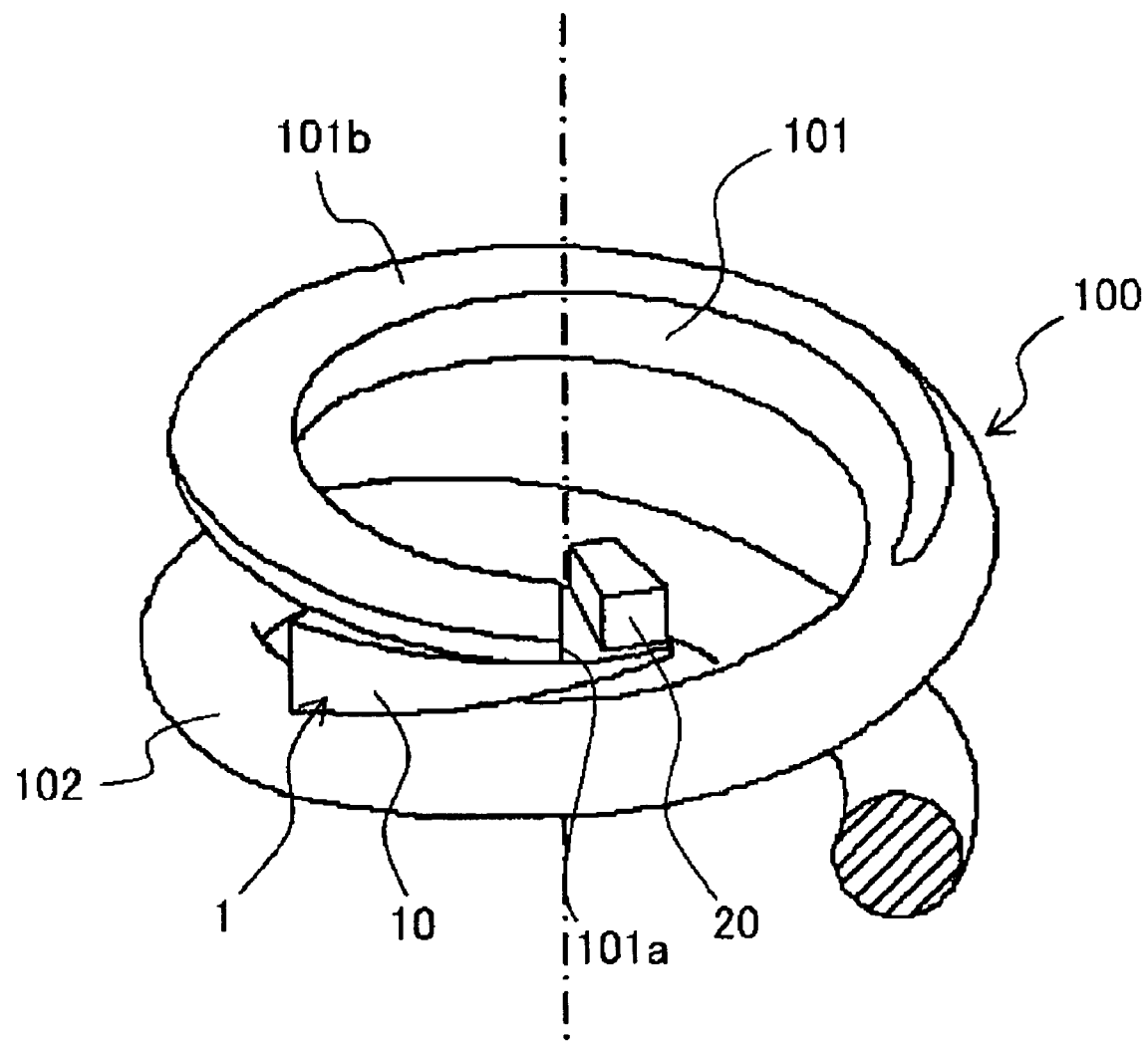
FIG. 4B is a perspective view of the spring spacer in a second interim position and between the first turn and the second turn of the spring illustrated in FIG. 2B.
Figure 4C:
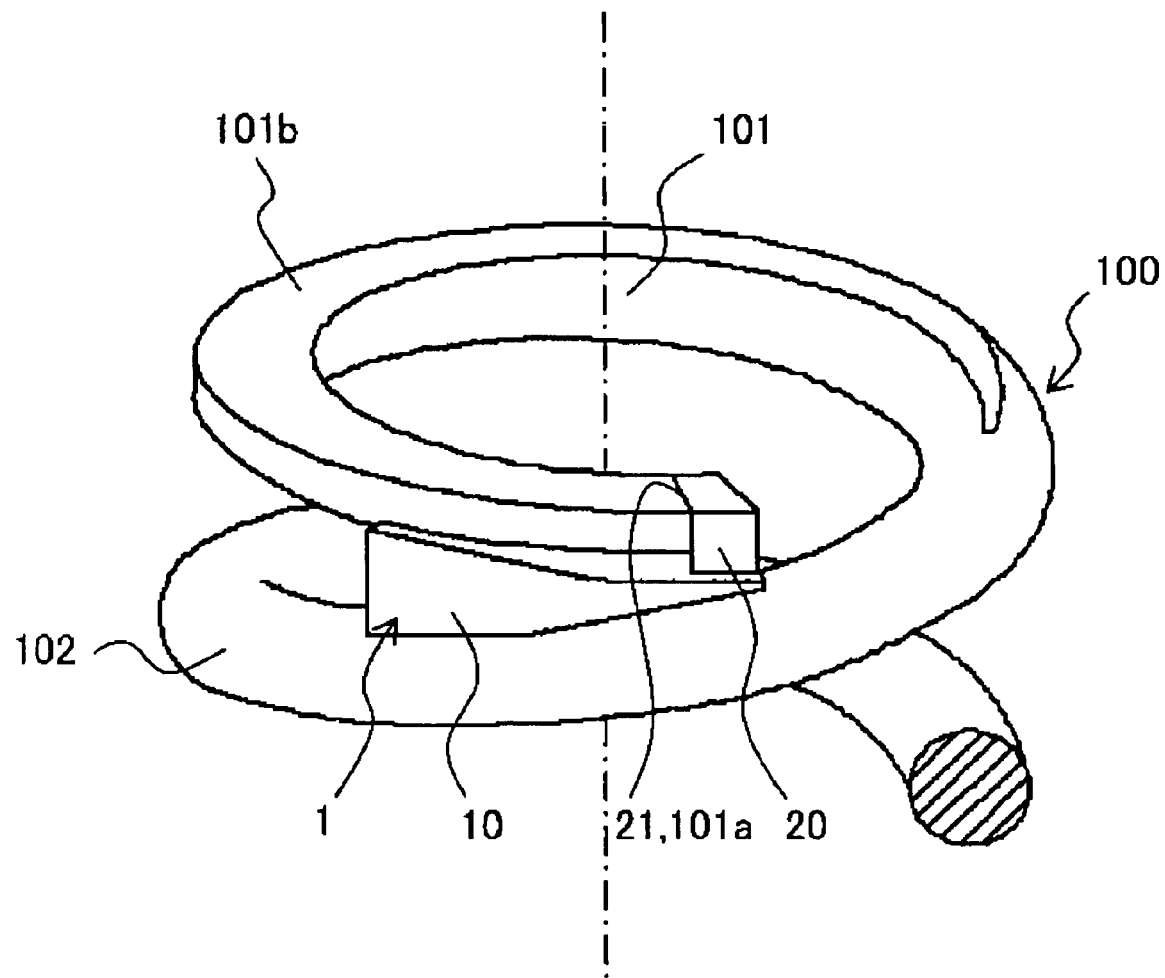
FIG. 4C is a perspective view of the spring spacer in a mounted position to the spring.

Subsequently, a method of mounting the spring spacer 1 on the Ti spring 100 will be described with reference to FIGS. 4A to 4C. FIGS. 4A to 4C are perspective views showing respective processes until the spring spacer according to the embodiment is mounted to the Ti spring.

As shown in FIG. 4A, the contact preventive portion 10 of the spring spacer 1 is arranged in a location, in which a spacing between the first turn 101 and the second turn 102 of the Ti spring 100 is large, and the spring spacer 1 is pushed toward the first turn 101 while the respective latch grooves 11, 12 (see FIG. 3) are caused to go along the first turn 101 and the second turn 102. At this time, the latch 20 of the spring spacer 1 is retreated inside the spring spacer 1 so as not to be interposed between the first turn 101 and the second turn 102.

As shown in FIG. 4B, the contact preventive portion 10 of the spring spacer 1 is pushed intact against the bias of the first turn 101 and the second turn 102 of the Ti spring 100 and the spring spacer 1 is corrected in posture when the latch 20 passes by the end 101a of the first turn 101.

Thereby, as shown in FIG. 4C, the respective latch grooves 11, 12 of the spring spacer 1 are fitted onto the first turn 101 and the second turn 102 and the latch 20 is caused to abut against the end 101a of the first turn 101, thus completing mounting of the spring spacer 1.

Figure 5:
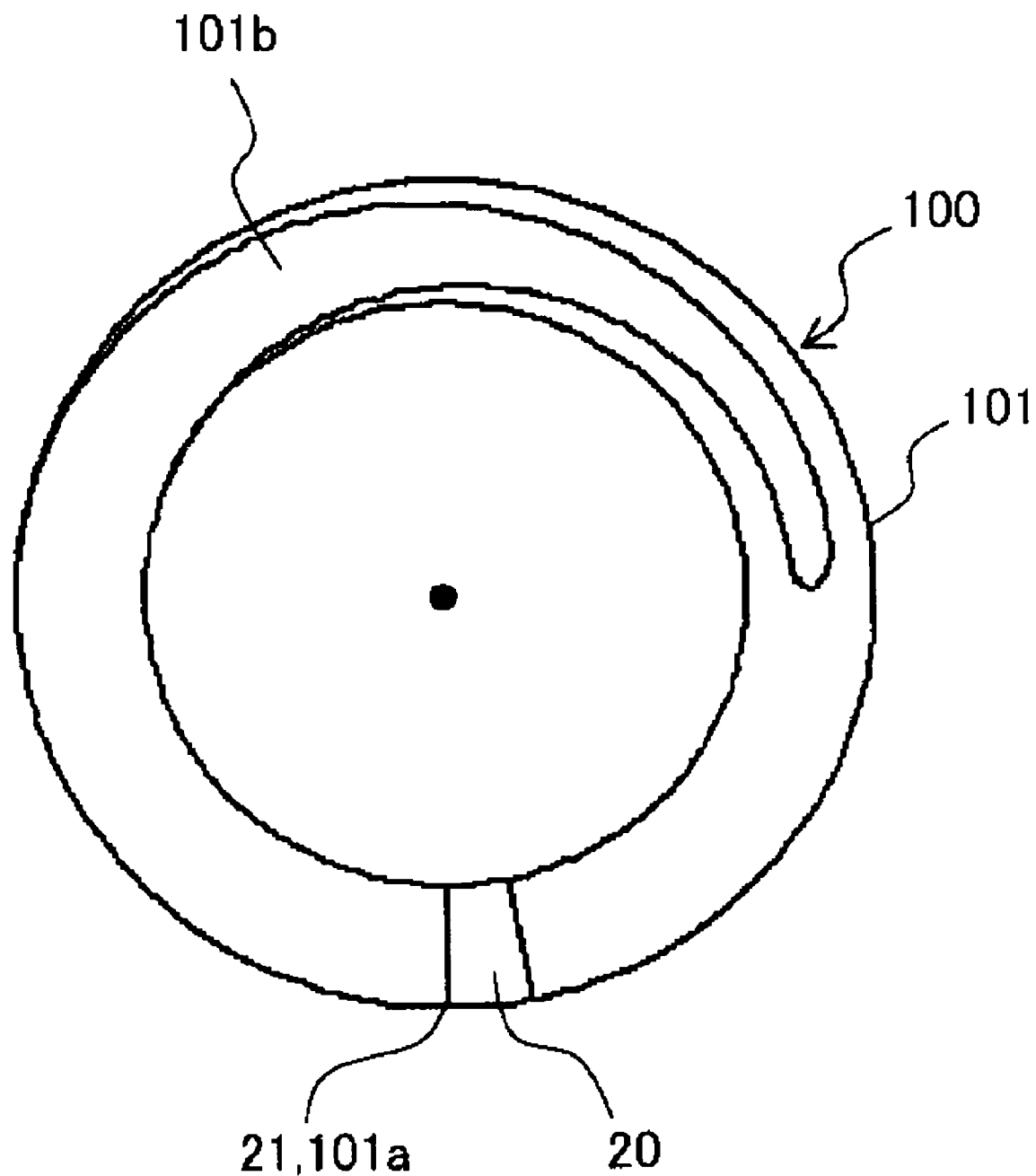
FIG. 5 is a plan view of the spring spacer in the mounted position illustrated in FIG. 4C.
Figure 6A:
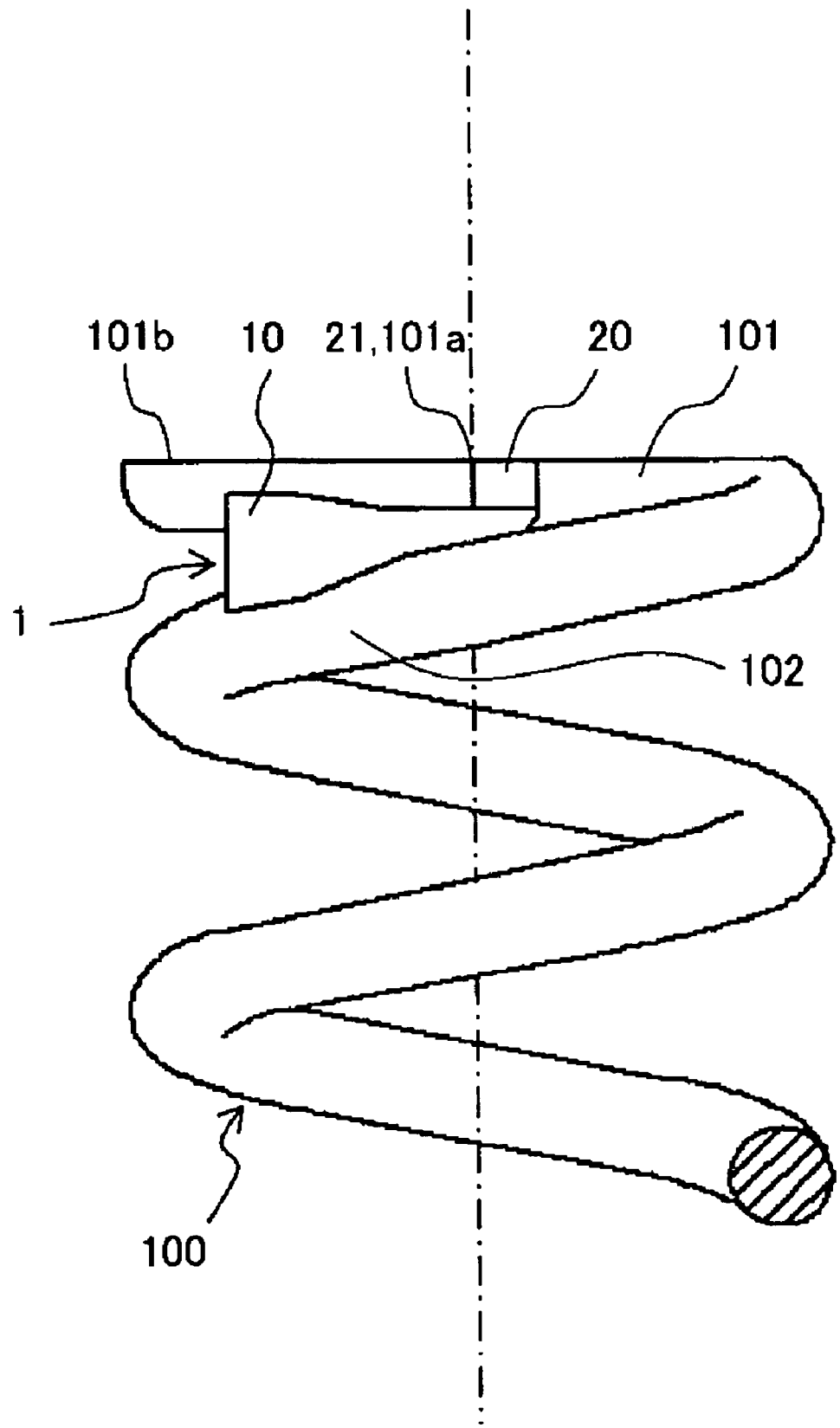
FIG. 6A is a front view of the spring spacer in the mounted position illustrated in FIG. 4C.
Figure 6B:
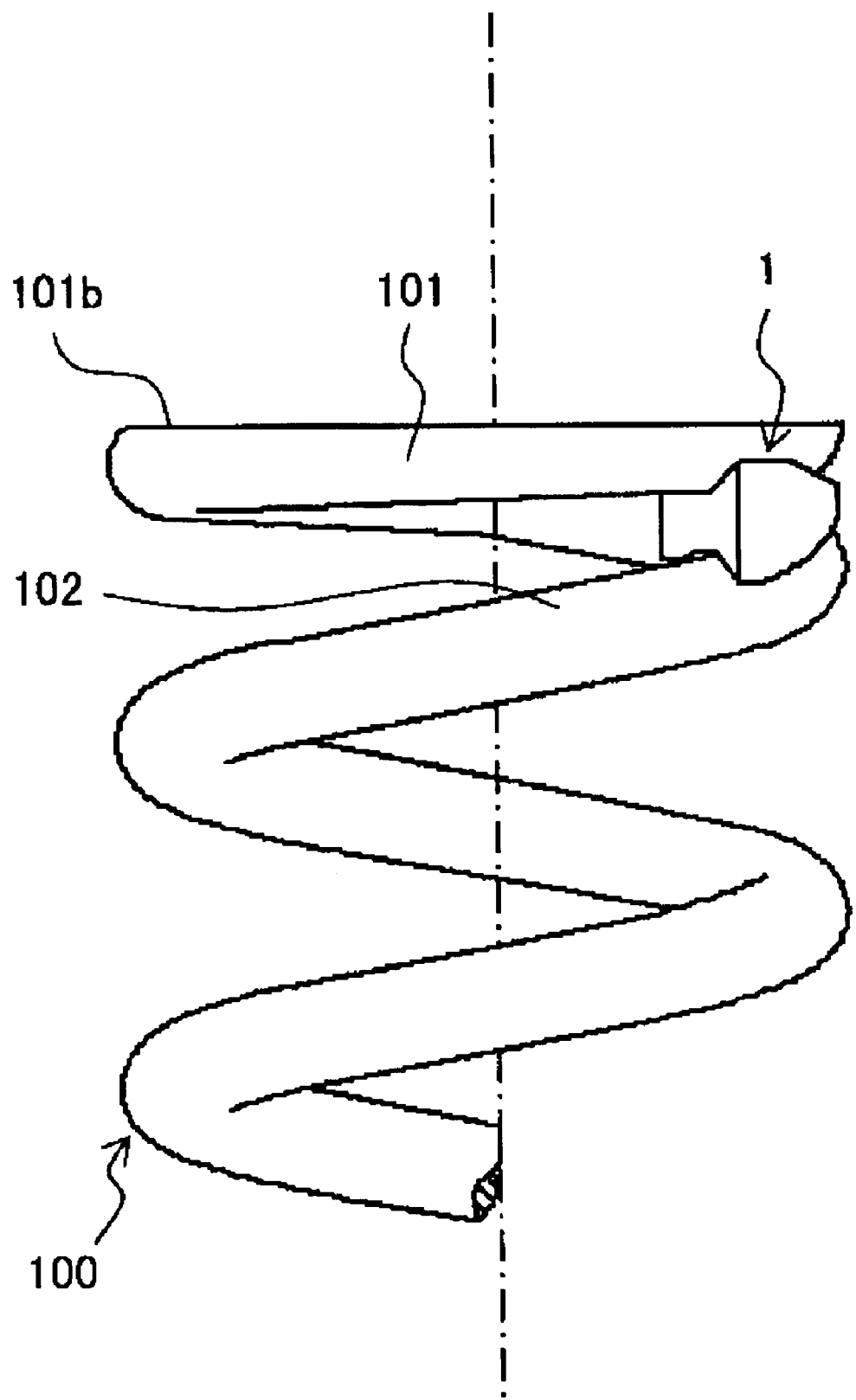
FIG. 6B is a left side view of the spring spacer in the mounted position illustrated in FIG. 4C.
Figure 6C:
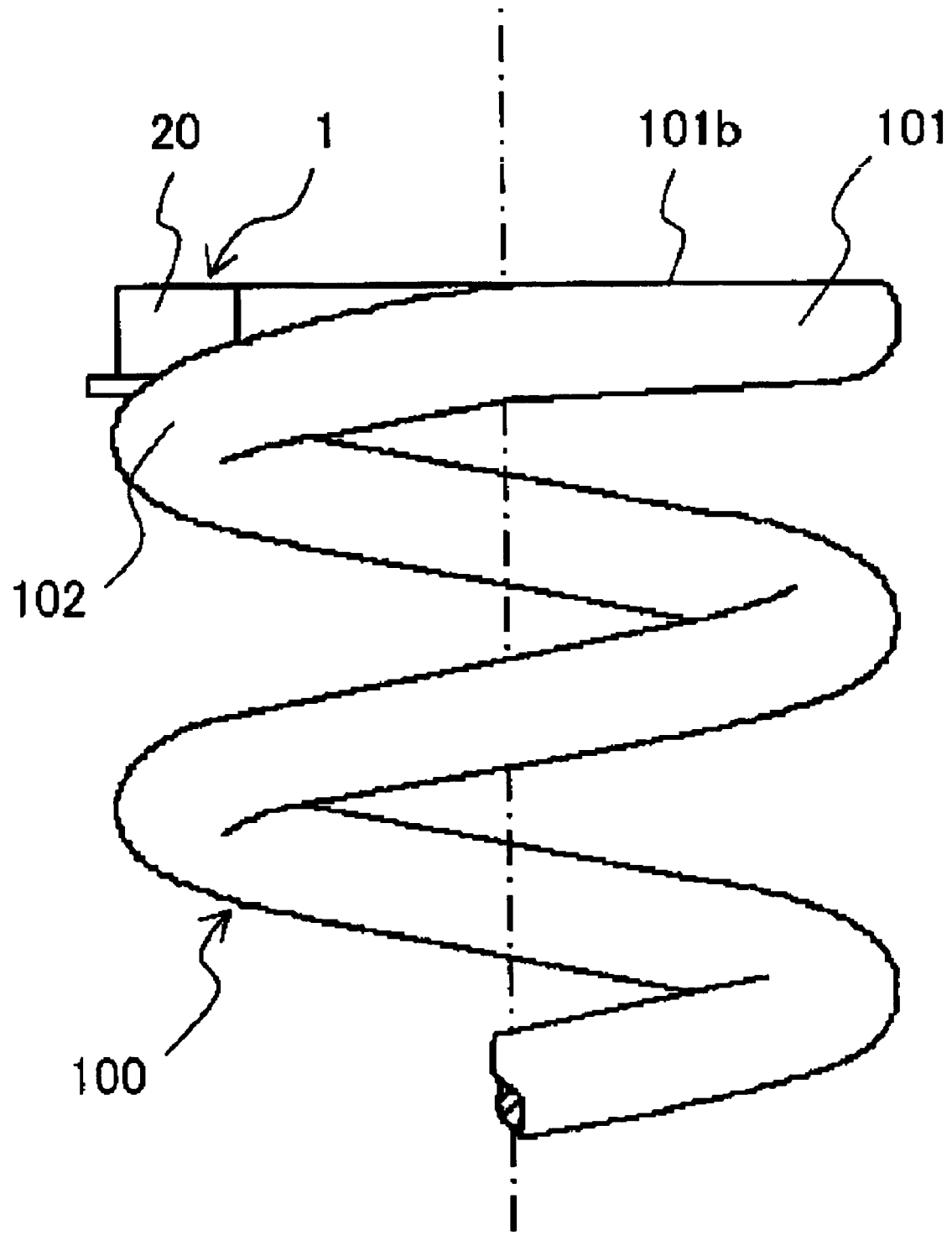
FIG. 6C is a right side view of the spring spacer in the mounted position illustrated in FIG. 4C.
Figure 6D:
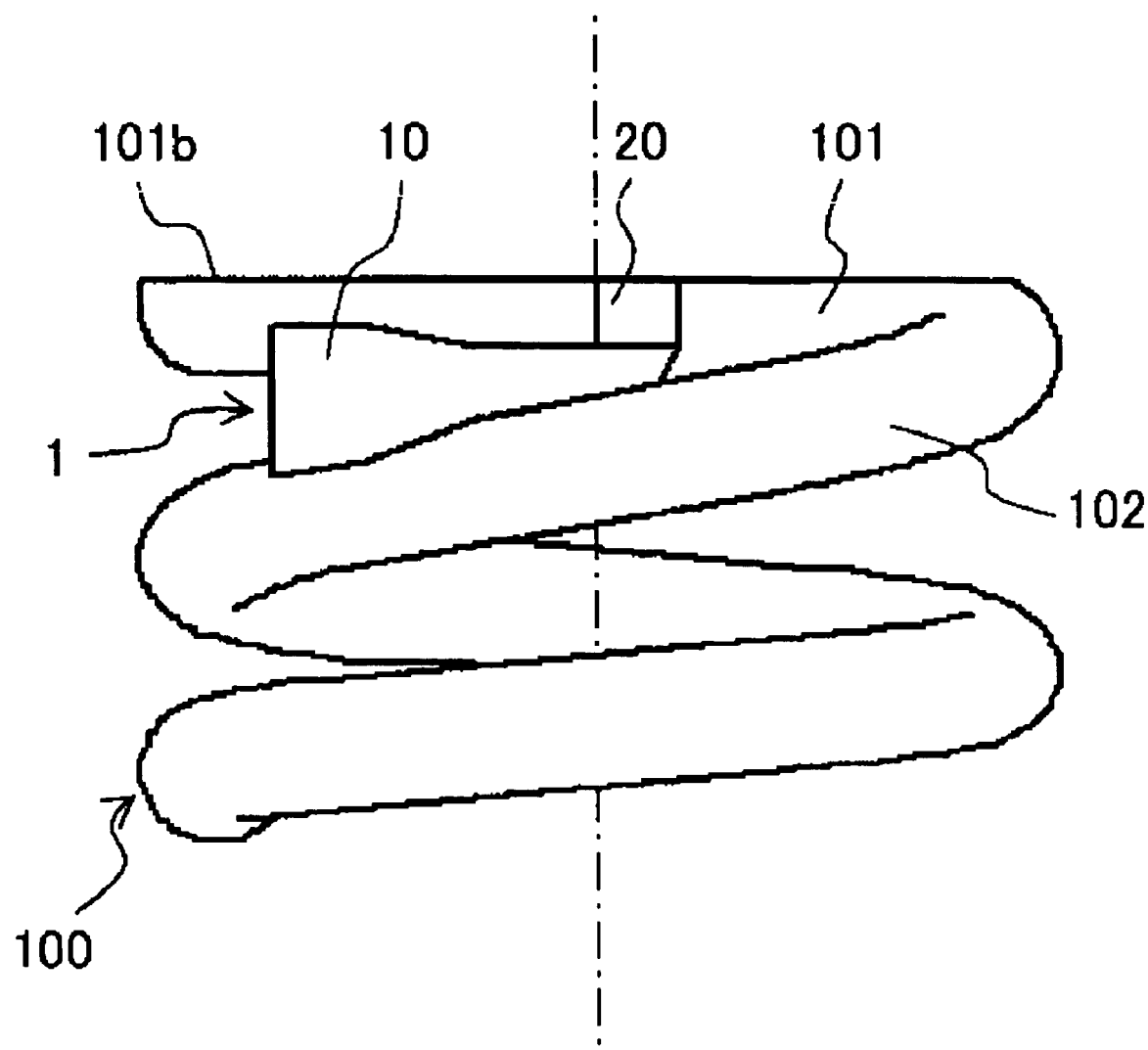
FIG. 6D is a front view of the spring spacer and an upper portion of the spring from FIG. 4C with the spring in a compressed state.

FIGS. 5, 6A, 6B, 6C, and 6D show a state, in which the spring spacer 1 is mounted to the Ti spring 100. FIG. 5 is a plan view, FIG. 6A is a front view, FIG. 6B is a left side view, FIG. 6C is a right side view, and FIG. 6D is a front view showing a state, in which the Ti spring contracts.

In a non-riding state of the motorcycle shown in FIG. 1, the rear arm 210 moves downward and the Ti spring 100 is put in an extended state. On the other hand, when the motorcycle is put in a riding state, the rear arm 210 moves upward and the Ti spring 100 is put in a contracted state. The spring spacer 1 according to the embodiment is press fitted and held between the first turn 101 and the second turn 102 at all times irrespective of an extended state of the Ti spring 100 shown in FIGS. 6A to 6C and a contracted state of the Ti spring 100 shown in FIG. 6D and prevents contact between the end 101a of the first turn 101 and the second turn 102.

The spring spacer 1 according to the embodiment is of a very simple structure to mainly include the contact preventive portion 10 and the latch 20, thus surely preventing contact between the end 101a of the first turn 101 and the second turn 102 of the Ti spring 100 to enable preventing contact and abrasion of the second turn 102. Thereby, it is possible to sharply improve the Ti spring 100, which is low in surface hardness, in durability.

Also, the latch grooves 11, 12 serving as holding portions are shaped not to contact with both the flange portion (spring bearing surface) 4b of the spring guide 4 and the Ti spring 100 all the time, for example, shaped not to be interposed between the flange portion 4b and the Ti spring 100 all the time. Thereby, it is possible to mount the spring spacer 1 to the Ti spring 100 at any time irrespective of before and after the Ti spring 100 is mounted to the suspension unit 214.

Further, the thickness L1 of the contact preventive portion 10 is made larger than the clearance L2 between the first turn 101 and the second turn 102 of the Ti spring 100. Thereby, the spring spacer 1 can be mounted to the Ti spring 100 by easy means in which the contact preventive portion 10 is press fitted into the clearance L2 in a manual work. As a result, it is possible to achieve an improvement in productivity of a suspension spring, a suspension unit, and a motorcycle, which are provided with the spring spacer 1. Further, by making the thickness L1 of the contact preventive portion 10 larger than the clearance L2 between the first turn 101 and the second turn 102 of the Ti spring 100, individual dispersion in shape with respect to both ends of the Ti spring 100 can be accommodated.

Besides, by fitting the respective latch grooves 11, 12 of the contact preventive portion 10 of the spring spacer 1 onto the outer peripheral surfaces of the first turn 101 and the second turn 102 of the Ti spring 100, it is possible to press fit and hold the spring spacer 1 further stably and to position the spring spacer 1 in an optimum position.

Also, the contact preventive portion 10 of the spring spacer 1 is arcuate to have substantially the same radius of curvature as that of the first turn 101 and the second turn 102 of the Ti spring 100 whereby it is possible to make the spring spacer 1 follow the arcuate shape of the first turn 101 and the second turn 102 of the Ti spring 100. Thereby, the spring spacer 1 does not extend outside the first turn 101 and the second turn 102 and the spring spacer 1 can be formed from a necessity minimum material.

Further, since only the spring spacer 1 is formed from hard rubber and the spring guide 4 is formed from metal, the spring guide 4 can posses durability for a very large load of the Ti spring 100.

Figure 7:
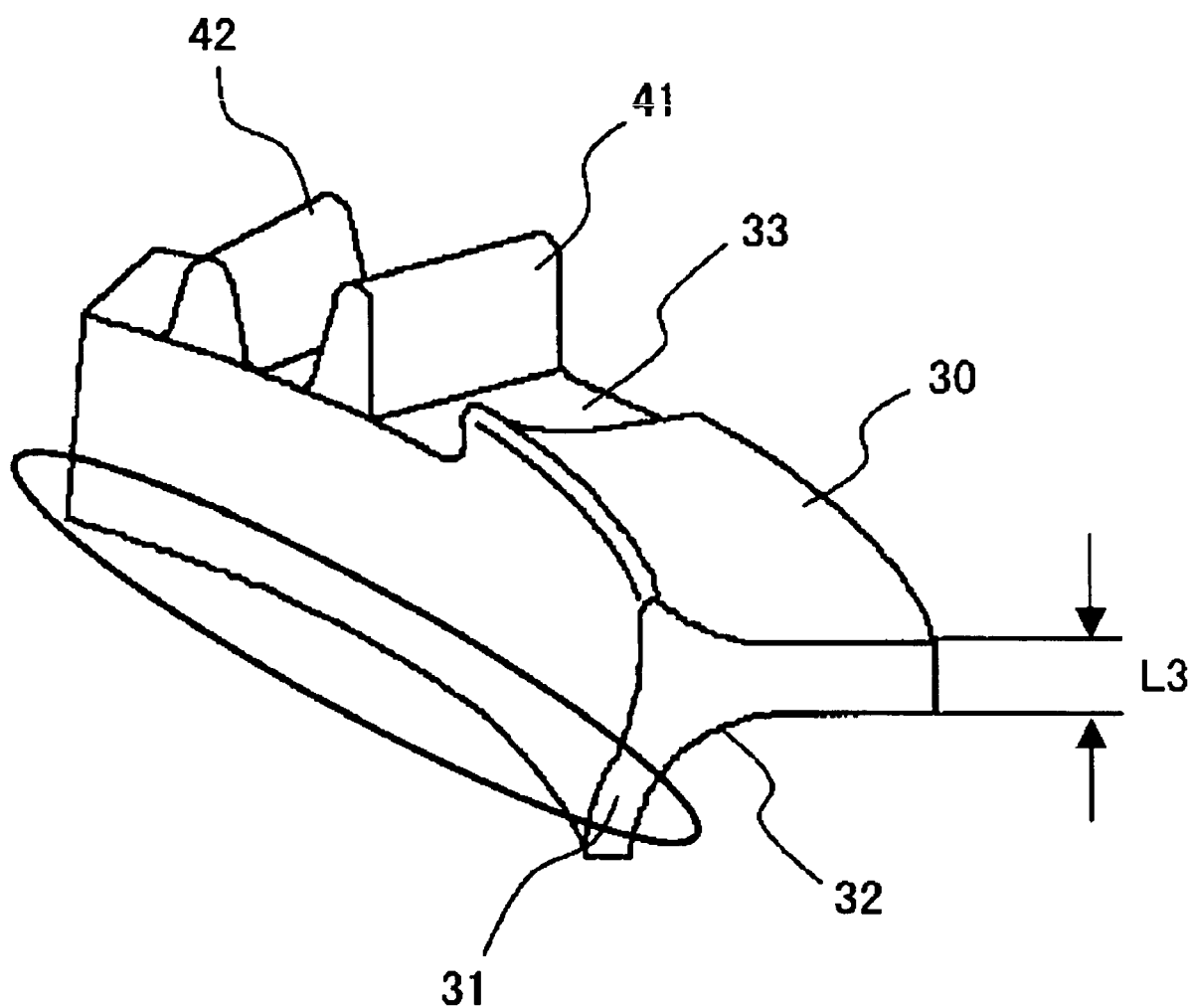
FIG. 7 is a perspective view showing a spring spacer according to a second embodiment of the invention.

Subsequently, a spring spacer according to a second embodiment of the invention will be described with reference to the drawings. FIG. 7 is a perspective view showing the spring spacer according to the second embodiment of the invention.

In the figure, the spring spacer 2 according to the embodiment mainly includes an abutment piece (holding portion) 31 formed contiguous to a side of a plate-shaped contact preventive portion 30 to extend downward, and latches 41, 42 comprising two piece members and provided protrusively at a predetermined interval on a tip end side of the contact preventive portion 30.

The thickness L3 of the contact preventive portion 30 is made thinner than the clearance L2 between the first turn 101 and the second turn 102 of the Ti spring 100 shown in FIG. 19, thus making it possible to insert and arrange the contact preventive portion 30 into the clearance L2 without any resistance. The contact preventive portion 30 is arcuate to have substantially the same radius of curvature as that of the first turn 101 and the second turn 102 of the Ti spring 100 in the same manner as in the first embodiment and the abutment piece 31 formed contiguous to the contact preventive portion 30 is also arcuate to have the same radius of curvature as that of the second turn 102.

Also, a continuous, inner peripheral surface 32 of the contact preventive portion 30 and the abutment piece 31 is arcuate in cross section to correspond to an inner peripheral surface of the second turn 102 of the Ti spring 100, thus enabling placing the spring spacer 2 on the second turn 102 of the Ti spring 100 in a stable state. Further, a stepwise recess 33 is provided on that portion of the contact preventive portion 30, which corresponds to the end 101a of the first turn 101, and the recess 33 is made smaller in thickness than the remaining portion.

On the other hand, the pair of the latches 41, 42 include the piece members, which are different in height and thickness from each other, and the latch 41 is made large in height and small in thickness as compared with the latch 42, and susceptible to deformation upon application of a load from above. Also, the latch 41 is made substantially triangular in cross section to have a large thickness on a base side thereof whereby it is made hard to deform upon application of a load from laterally. Such latch 41 abuts against the end 101a of the first turn 101 of the Ti spring 100 to prevent the spring spacer 2 from moving toward the second turn 102 (see FIG. 8B).

Also, the latch 42 is made small in height and large in thickness as compared with the latch 41, and susceptible to deformation upon application of a load from above while deformation is less than that of the latch 41. In the case where the spring guide 4 shown in FIG. 10D is mounted on the cut flat surface 101b of the first turn 101 of the Ti spring 100, a space toward the first turn 101 is narrowed heightwise, so that movement of the spring spacer 2 toward the first turn 101 is prevented by the latch 42.

Figure 8A:
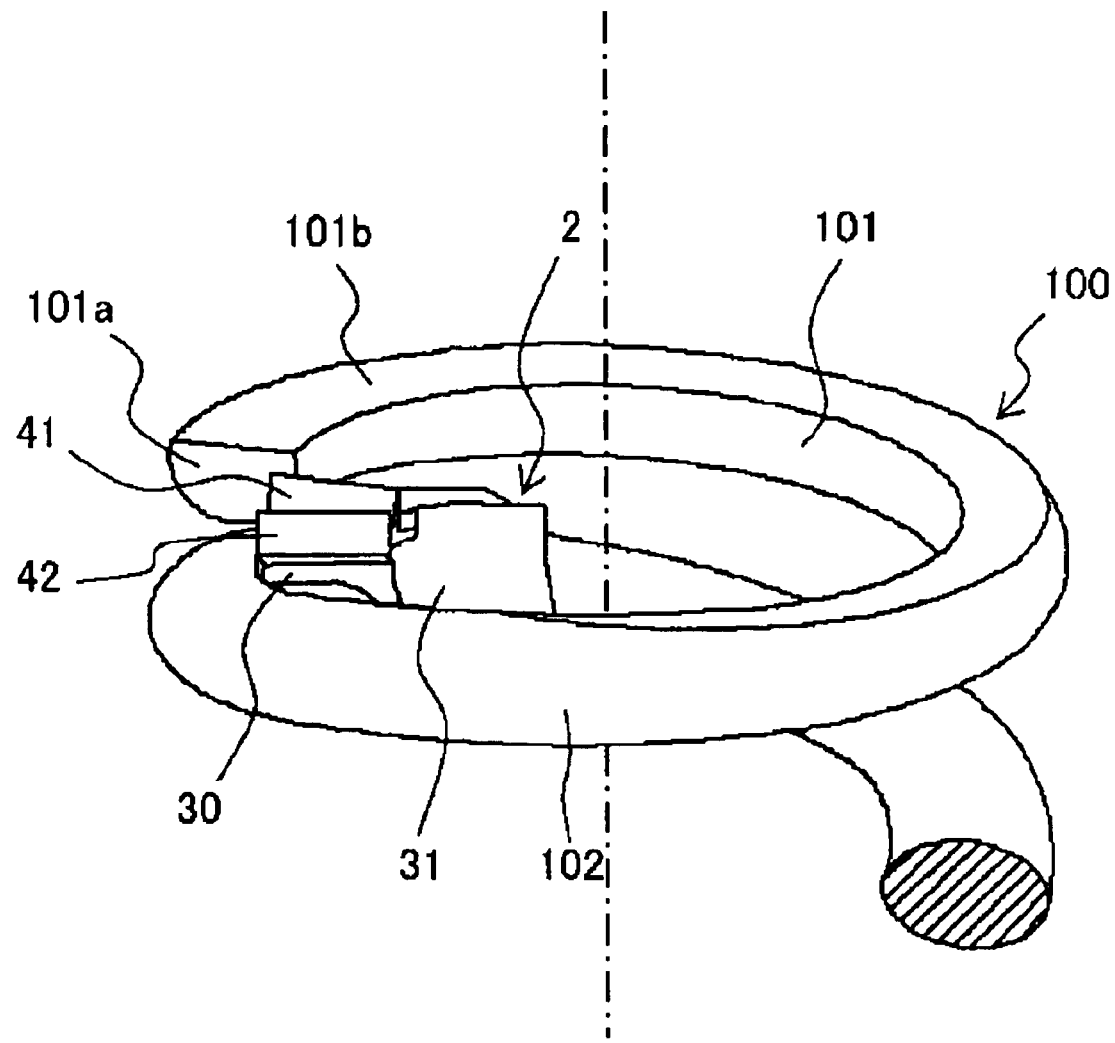
FIG. 8A is a perspective view of the spring spacer illustrated in FIG. 7 in a first interim position and between a first turn and a second turn of the spring illustrated in FIG. 2B.
Figure 8B:
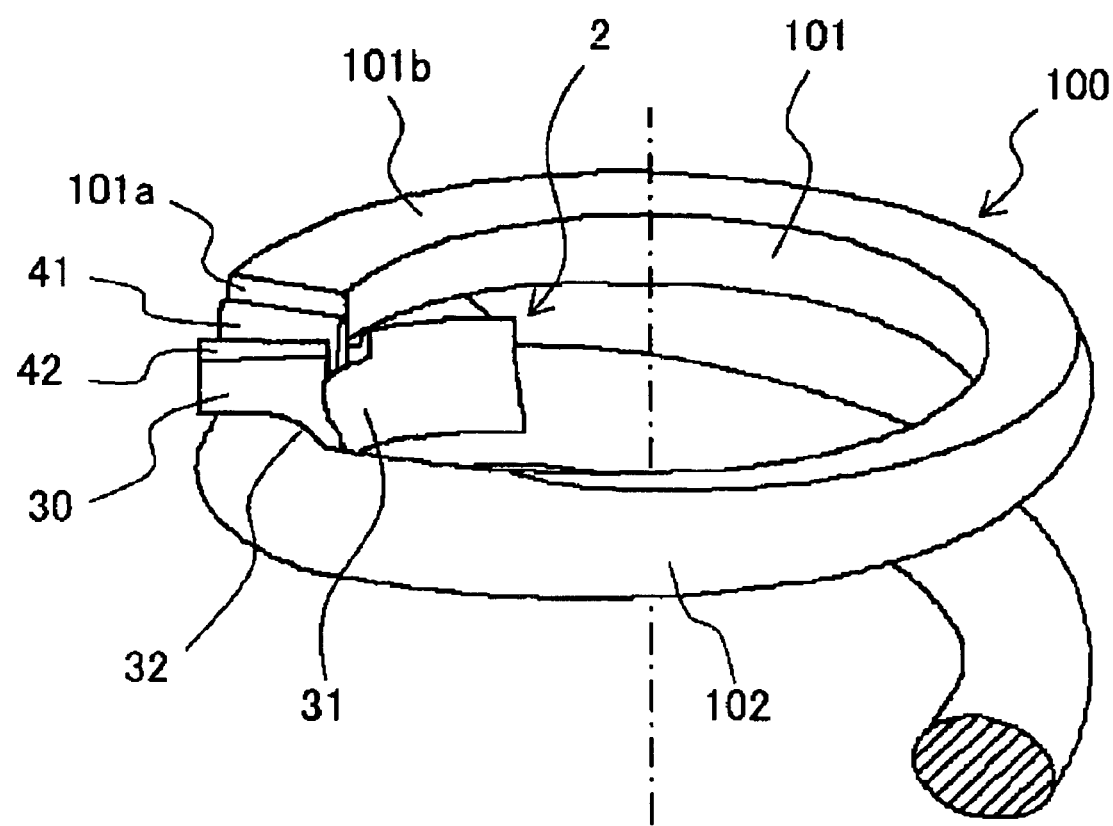
FIG. 8B is a perspective view of the spring spacer illustrated in FIG. 7 in a mounted position to the spring.

Subsequently, a method of mounting the spring spacer 2 on the Ti spring 100 will be described with reference to FIGS. 8A and 8B. FIGS. 8A and 8B are perspective views showing respective processes until the spring spacer according to the embodiment is mounted to the Ti spring.

As shown in FIG. 8A, the spring spacer 2 is arranged inside the Ti spring 100, and as shown in FIG. 8B, the contact preventive portion 30 of the spring spacer 2 is inserted into the clearance L2 between the first turn 101 and the second turn 102 of the Ti spring 100.

Figure 9:
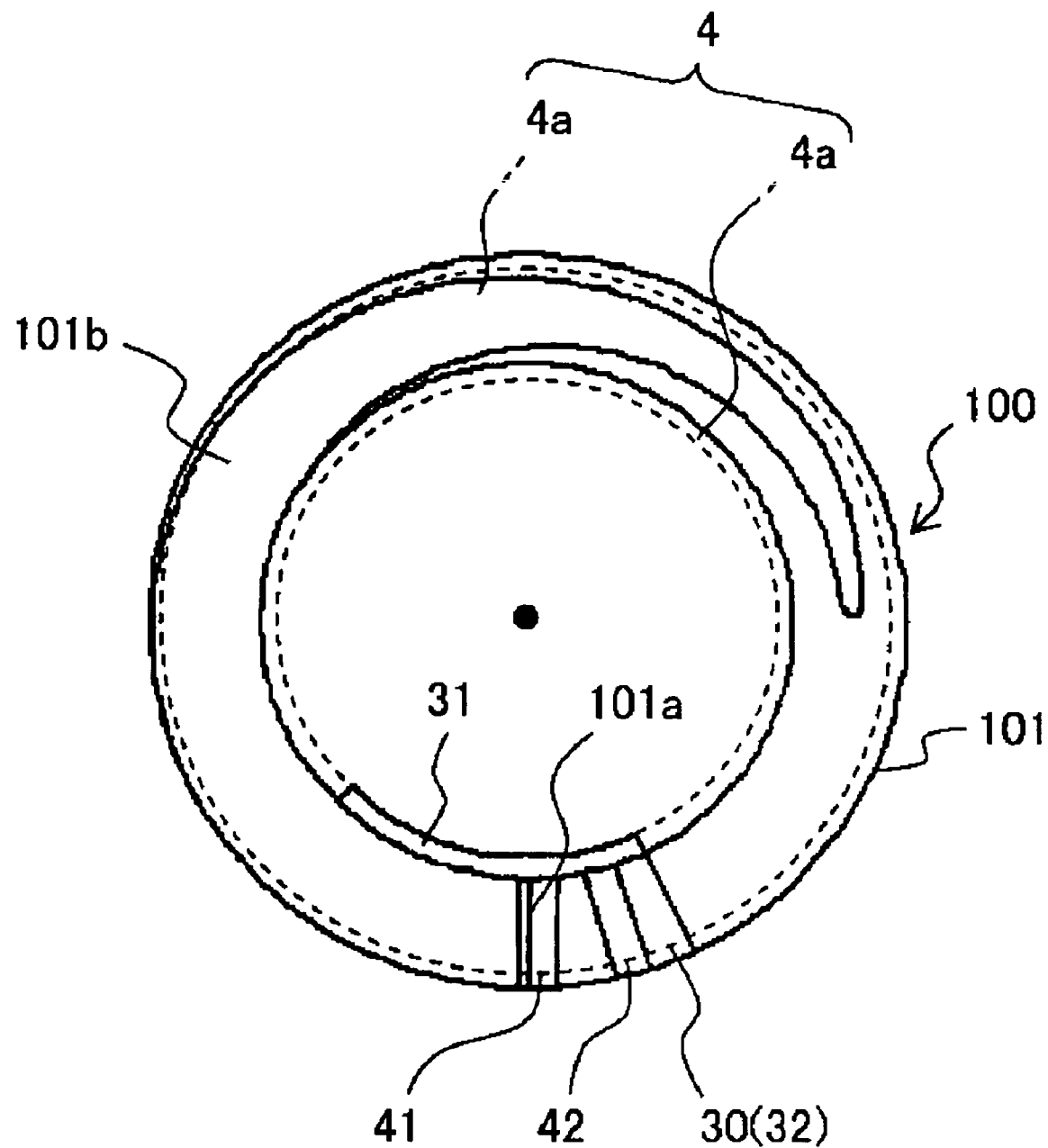
FIG. 9 is a plan view of the spring spacer in the mounted position illustrated in FIG. 8B.

Then, the latch 41 of the spring spacer 2 is caused to abut against the end 101a of the first turn 101 of the Ti spring 100 and the abutment piece 31 of the spring spacer 2 is caused to abut against the inner peripheral surface of the second turn 102 of the Ti spring 100, thus temporarily latching the spring spacer 2 thereon. FIGS. 9, 10A, 10B, and 10C show a temporarily latched state of the spring spacer 2. FIG. 9 is a plan view, FIG. 10A is a front view, FIG. 10B is a left side view, and FIG. 10C is a right side view.

Finally, as shown in an enlarged view of FIG. 10D, mounting of the spring spacer 2 is completed by mounting the spring guide 4 to the first turn 101 of the Ti spring 100. That is, a trunk portion 4a of the spring guide 4 is pushed onto an inner periphery of the first turn 101 of the Ti spring 100 to cause an annular (e.g., torus-shaped) flange portion 4b to abut against the cut flat surface 101b of the first turn 101 of the Ti spring 100.

Thereby, the trunk portion 4a of the spring guide 4 holds down the spring spacer 2 from inside the Ti spring 100, so that coming-out inside the Ti spring 100 is prevented. That is, the abutment piece 31 is held down by the trunk portion 4a of the spring guide 4 to hold the spring spacer 2 indirectly. Also, the abutment piece 31 abuts against the inner peripheral surface of the second turn 102 to prevent coming-out of the spring spacer 2 outside the Ti spring 100.

In a non-riding state of the motorcycle shown in FIG. 1, the rear arm 210 moves downward and the Ti spring 100 is put in an extended state. At this time, the first turn 101 of the Ti spring 100 does not abut against the contact preventive portion 30 of the spring spacer 2. On the other hand, when the motorcycle is put in a riding state, the rear arm 210 moves upward and the Ti spring 100 is put in a contracted state.

At this time, the first turn 101 of the Ti spring 100 abuts against the contact preventive portion 30 of the spring spacer 2 to prevent contact between the end 101a of the first turn 101 and the second turn 102. Also, the stepwise recess 33 is formed on that portion of the contact preventive portion 30, which corresponds to the end 101a, whereby contact between the end 101a and the contact preventive portion 30 is prevented.

With the spring spacer 2 according to the embodiment, the thickness L3 of the contact preventive portion 30 is made smaller than that clearance L2 between the first turn 101 and the second turn 102 of the Ti spring 100, in which the contact preventive portion 30 is mounted. Thereby, it is possible to arrange the spring spacer 2 in the clearance L2 between the first turn 101 and the second turn 102 of the Ti spring 100 without any resistance. Also, the abutment piece 31 of the spring spacer 2 can be easily mounted to the Ti spring 100 by using the existing spring guide 4 to hold down the abutment piece 31 of the spring spacer from inside.

Also, the spring spacer 2 according to the embodiment involves a possibility that when the Ti spring 100 contracts and the clearance L2 becomes narrow, the end 101a of the first turn 101 contacts with the contact preventive portion 30. Even in such case, the end 101a can be prevented from contacting with the contact preventive portion 30 since the stepwise recess 33 is formed on that portion of the contact preventive portion 30, which corresponds to the end 101a.

Further, with the spring spacer 2 according to the embodiment, the latches 41, 42 include a piece member susceptible to deformation upon application of a load from above. Thereby, even in the case where the latches 41, 42 of the spring spacer 2 project from the end 101a of the first turn 101 of the Ti spring 100 by virtue of dimensional error of the Ti spring 100, the spring guide 4 can be fitted onto the first turn 101 of the Ti spring 100 without a gap by flexibly deforming the latches 41, 42.

Figure 11:
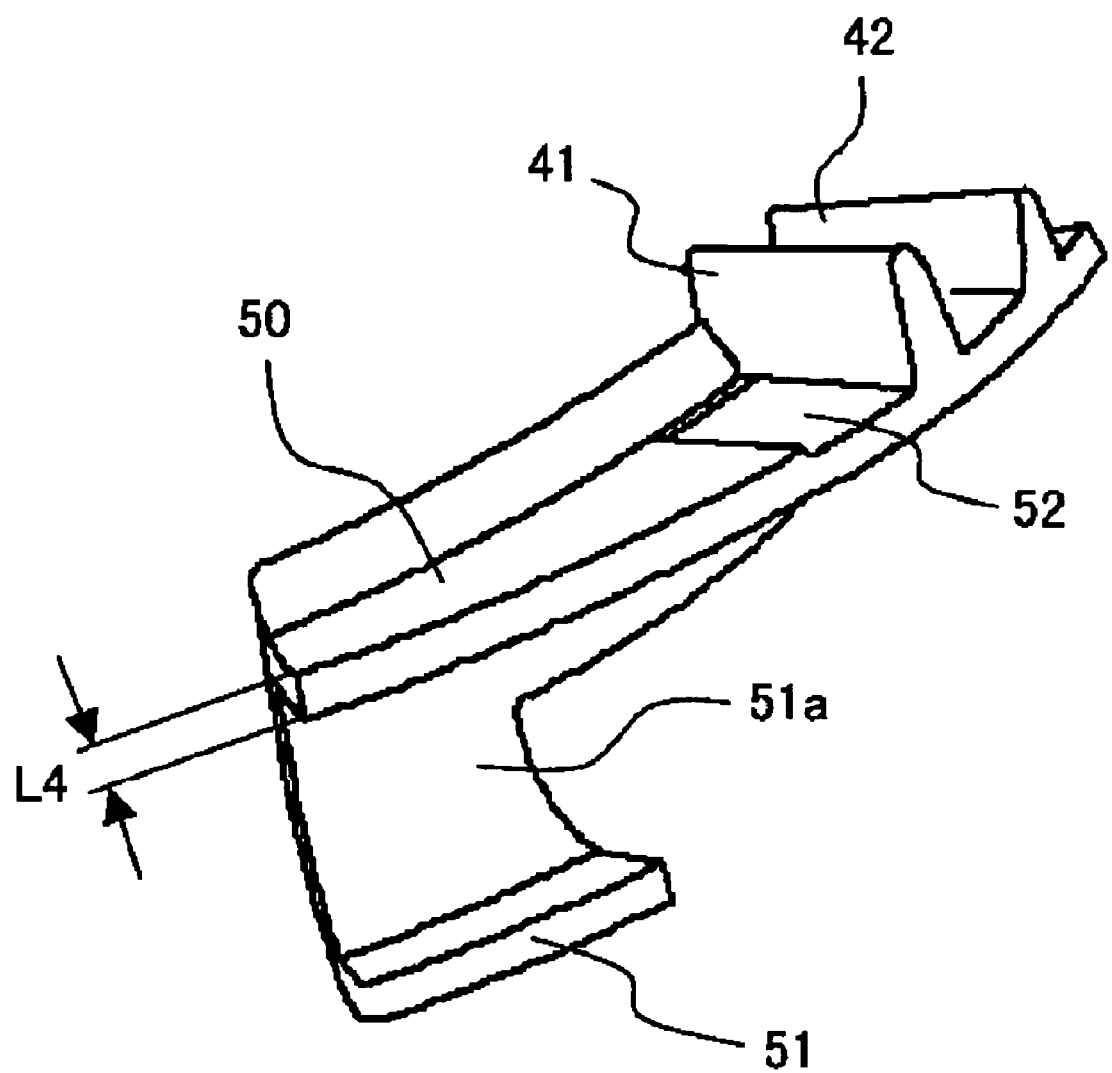
FIG. 11 is a perspective view showing a spring spacer according to a third embodiment of the invention.

Subsequently, a spring spacer according to a third embodiment of the invention will be described with reference to the drawings. FIG. 11 is a perspective view showing the spring spacer according to the third embodiment of the invention. In addition, the same parts as those of the second embodiment described above are denoted by the same reference numerals as those therein, and a detailed explanation therefor is omitted.

In the figure, a spring spacer 3 according to the embodiment mainly includes an elastic engagement piece 51 formed contiguous to a side of a plate-shaped contact preventive portion 50 to extend downward to bend outward, and latches 41, 42 provided protrusively at a predetermined interval on a tip end side of the contact preventive portion 50 to be similar to those in the second embodiment.

Like the second embodiment, a thickness L4 of the contact preventive portion 50 is made thinner than the clearance L2 between the first turn 101 and the second turn 102 of the Ti spring 100 shown in FIG. 19, thus making it possible to insert and arrange the contact preventive portion 50 into the clearance L2 without any resistance. The contact preventive portion 50 is arcuate to have substantially the same radius of curvature as that of the first turn 101 and the second turn 102 of the Ti spring 100 in the same manner as in the first embodiment.

Also, an inner peripheral surface 51a of the elastic engagement piece 51 is arcuate in cross section to correspond to an inner peripheral surface of the second turn 102 of the Ti spring 100, thus enabling elastically holding the inner peripheral surface of the second turn 102. Further, the inner peripheral surface 51a of the elastic engagement piece 51 is a little smaller in radius of curvature than the inner peripheral surface of the second turn 102 of the Ti spring 100, so that even in the case where a dimensional error appears in the diameter of the second turn 102, a sufficient holding force is obtained. In addition, like the first embodiment, a stepwise recess 52 is provided on that portion of the contact preventive portion 50, which corresponds to the end 101a of the first turn 101, and the recess 52 is made smaller in thickness than the remaining portion.

Figure 12A:
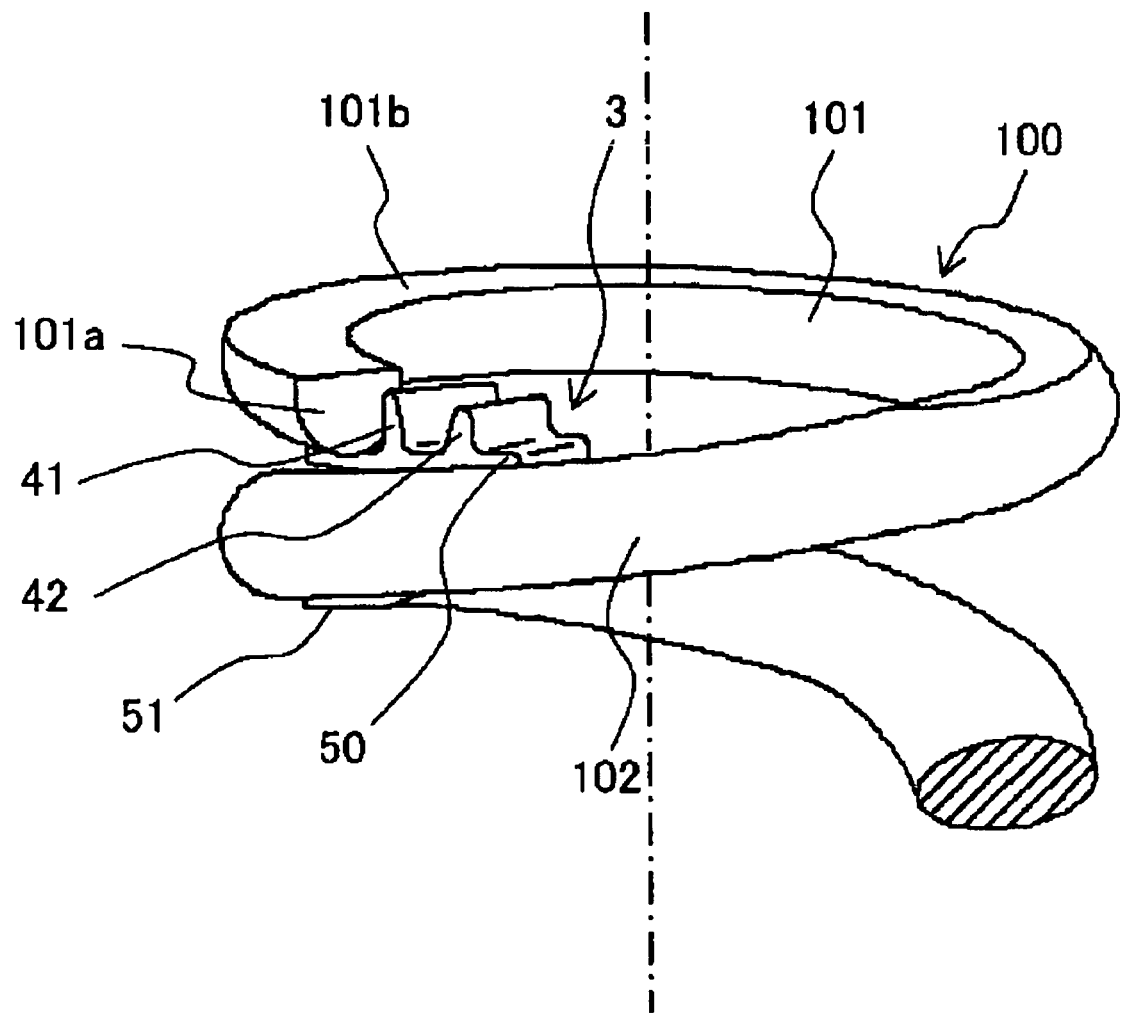
FIG. 12A is a perspective view of the spring spacer illustrated in FIG. 11 in a first interim position and between a first turn and a second turn of the spring illustrated in FIG. 2B.
Figure 12B:
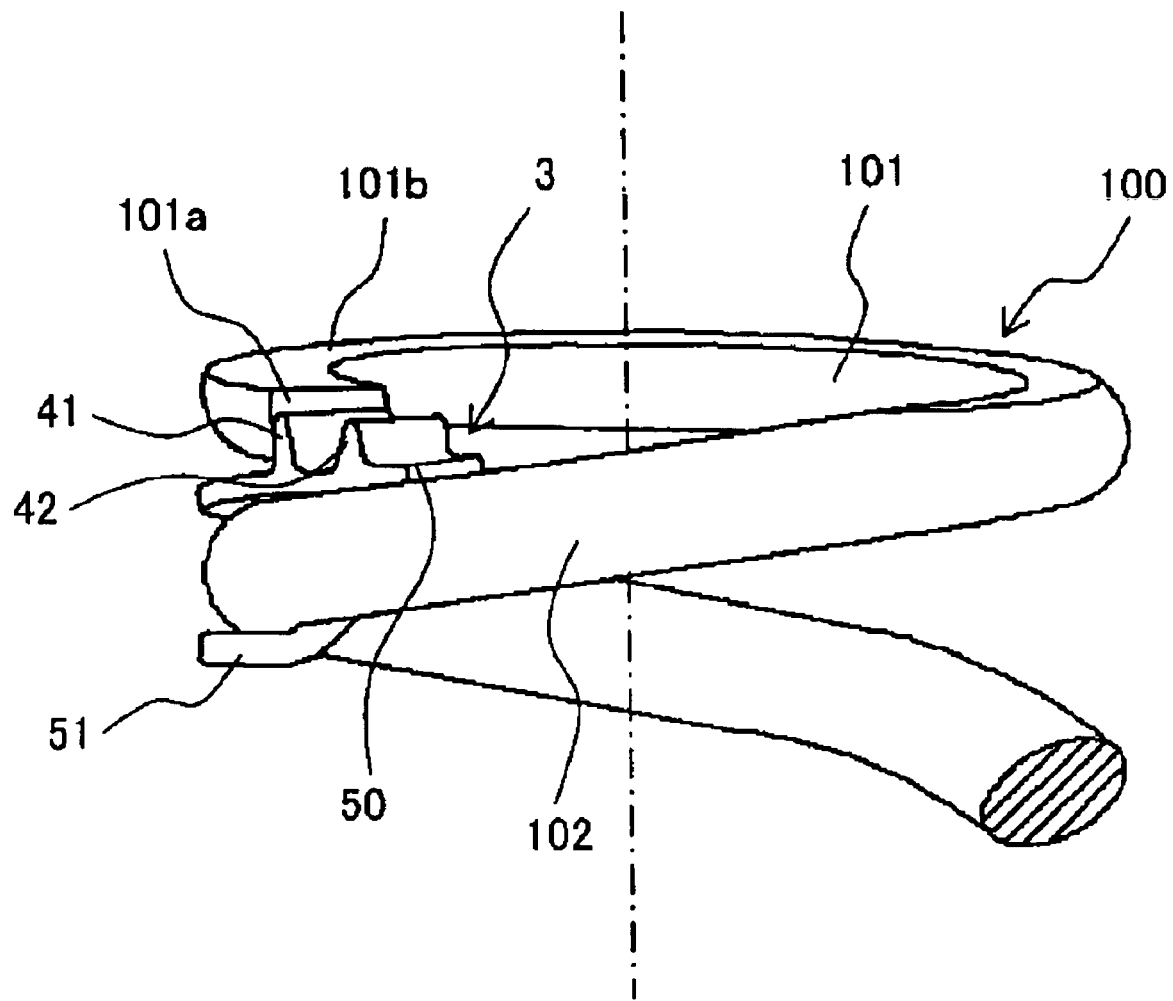
FIG. 12B is a perspective view of the spring spacer illustrated in FIG. 11 in a second interim position and between the first turn and the second turn of the spring illustrated in FIG. 2B.
Figure 12C:
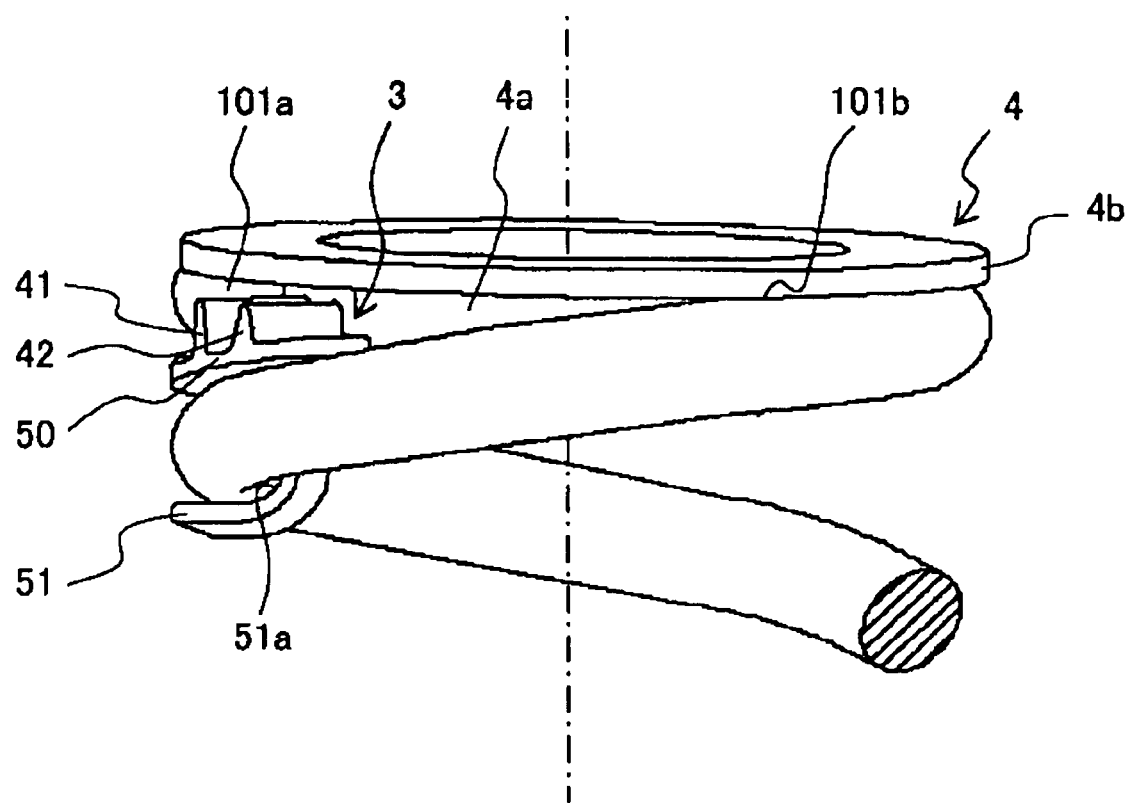
FIG. 12C is a perspective view of the spring spacer in a mounted position to the spring.

Subsequently, a method of mounting the spring spacer 3 on the Ti spring 100 will be described with reference to FIGS. 12A, 12B, and 12C. FIGS. 12A to 12C are perspective views showing respective processes until the spring spacer according to the embodiment is mounted to the Ti spring.

Figure 13:
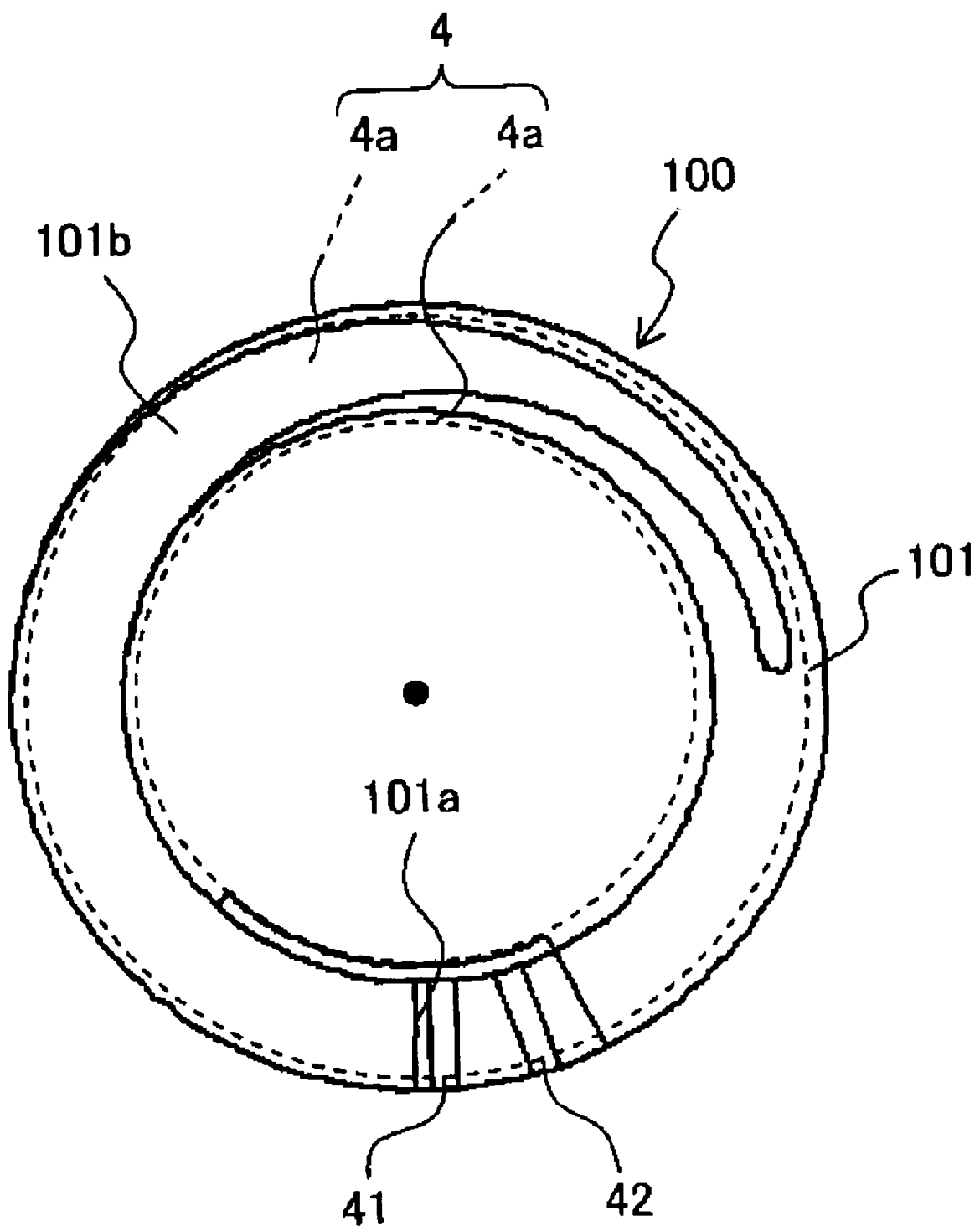
FIG. 13 is a plan view of the spring spacer in the mounted position illustrated in FIG. 12C.

As shown in FIG. 12A, the spring spacer 3 is arranged inside the Ti spring 100. As shown in FIG. 12B, the contact preventive portion 50 of the spring spacer 3 is inserted into the clearance L2 between the first turn 101 and the second turn 102 of the Ti spring 100, and the elastic engagement piece 51 of the spring spacer 3 is caused to elastically engage with the inner peripheral surface of the second turn 102 of the Ti spring 100, thus temporarily latching the spring spacer 3 thereon. FIGS. 13, 14B, and 14C show a temporarily latched state of the spring spacer 3. FIG. 13 is a plan view, FIG. 14B is a left side view, and FIG. 14C is a right side view.

Figure 14A:
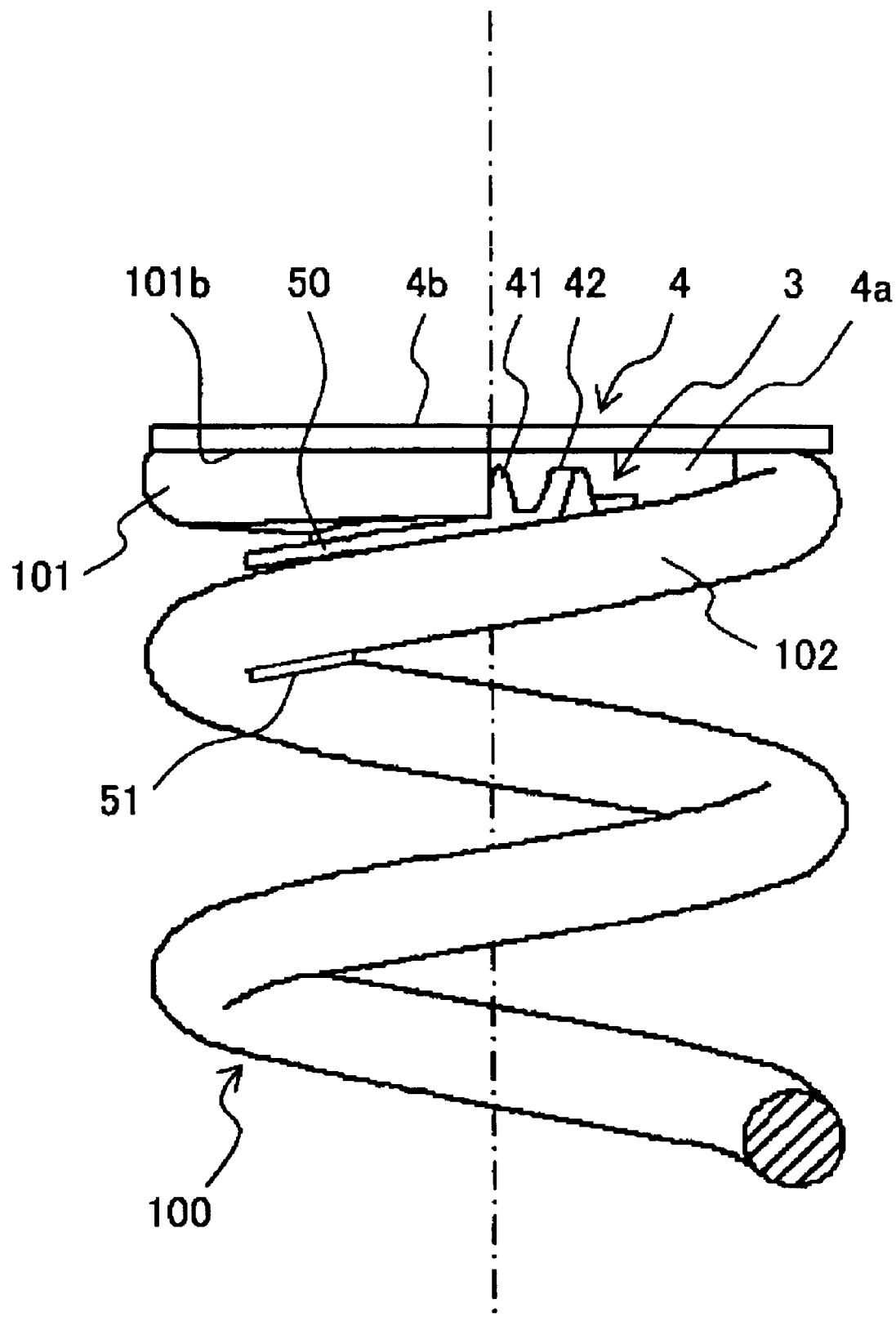
FIG. 14A is a front view of the spring spacer in the mounted position illustrated in FIG. 12C.
Figure 14B:
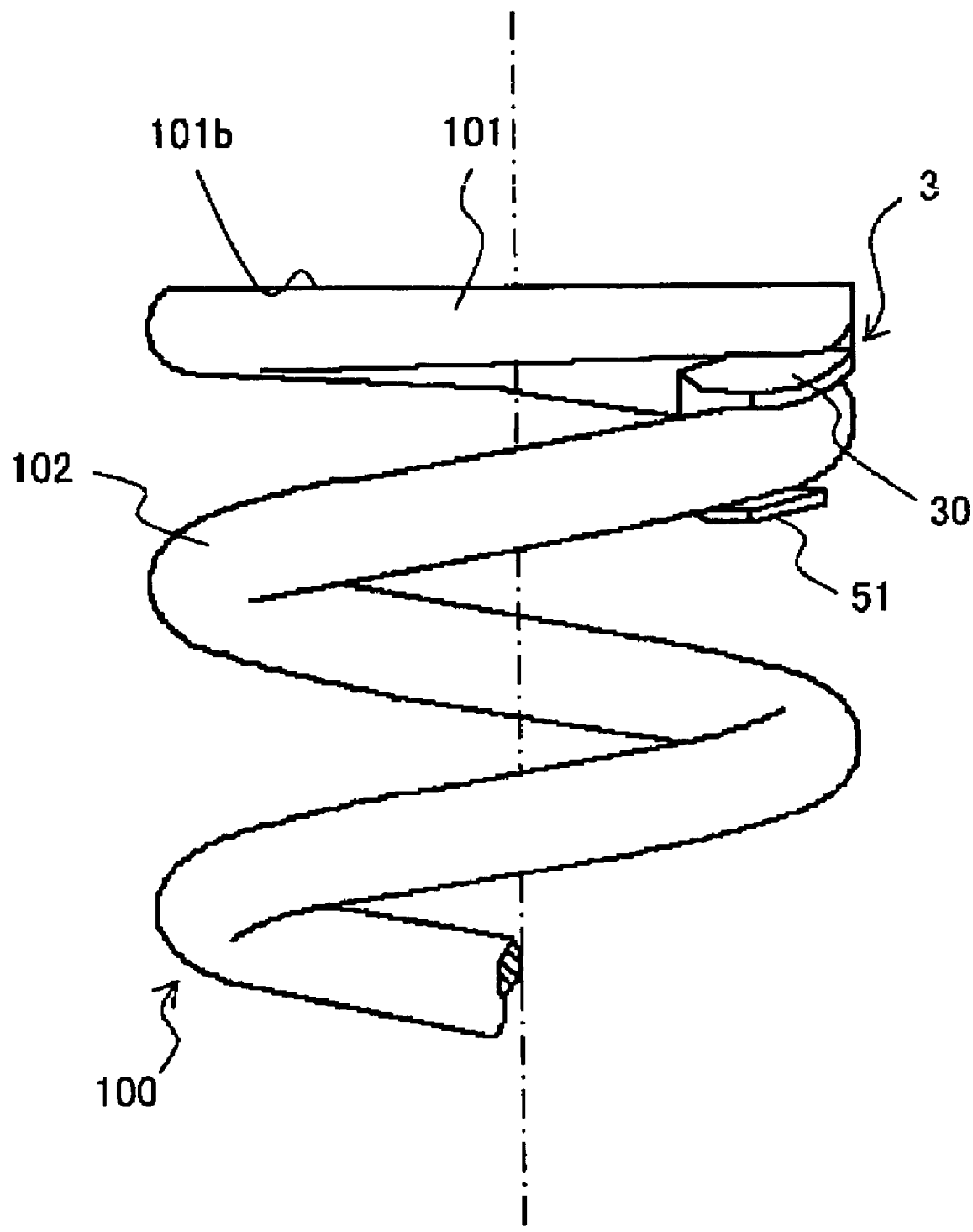
FIG. 14B is a left side view of the spring spacer in the mounted position illustrated in FIG. 12C.
Figure 14C:
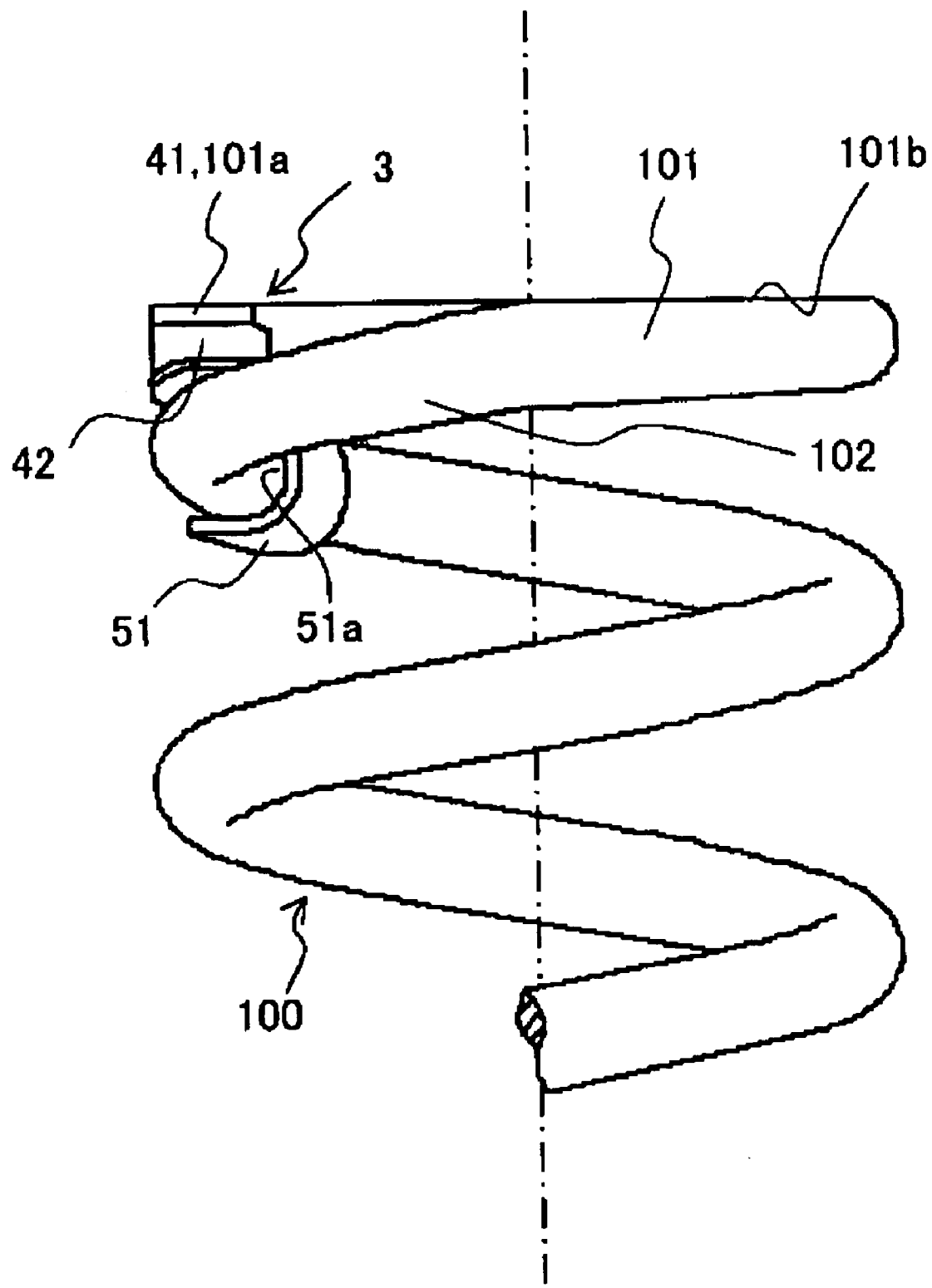
FIG. 14C is a right side view of the spring spacer in the mounted position illustrated in FIG. 12C.

Finally, as shown in an enlarged view of FIG. 12C and a front view of FIG. 14A, mounting of the spring spacer 3 is completed by mounting the spring guide 4 to the first turn 101 of the Ti spring 100. That is, the trunk portion 4a of the spring guide 4 is pushed onto an inner periphery of the first turn 101 of the Ti spring 100 to cause an annular (e.g., torus-shaped) flange portion 4b thereof to abut against the cut flat surface 101b of the first turn 101 of the Ti spring 100. Thereby, the trunk portion 4a of the spring guide 4 holds down the spring spacer 3 from inside the Ti spring 100, so that coming-out inside the Ti spring 100 is prevented. Also, the elastic engagement piece 51 abuts against the inner peripheral surface of the second turn 102 to prevent coming-out of the spring spacer 3 outside the Ti spring 100.

In a non-riding state of the motorcycle shown in FIG. 1, the rear arm 210 moves downward and the Ti spring 100 is put in an extended state. At this time, the first turn 101 of the Ti spring 100 does not abut against the contact preventive portion 50 of the spring spacer 3. On the other hand, when the motorcycle is put in a riding state, the rear arm 210 moves upward and the Ti spring 100 is put in a contracted state.

At this time, the first turn 101 of the Ti spring 100 abuts against the contact preventive portion 50 of the spring spacer 3 to prevent contact between the end 101a of the first turn 101 and the second turn 102. Also, the stepwise recess 52 is formed on that portion of the contact preventive portion 50, which corresponds to the end 101a, whereby contact between the end 101a and the contact preventive portion 50 is prevented.

With the spring spacer 3 according to the embodiment, the thickness L4 of the contact preventive portion 50 is made smaller than that clearance L2 between the first turn 101 and the second turn 102 of the Ti spring 100, in which the contact preventive portion 50 is mounted. Thereby, it is possible in the same manner as in the second embodiment to arrange the spring spacer 3 in the clearance L2 between the first turn 101 and the second turn 102 of the Ti spring 100 without any resistance.

Besides, with the spring spacer 3 according to the embodiment, by elastically engaging the elastic engagement piece 51 with the inner peripheral surface of the second turn 102 of the Ti spring 100, it is possible to stably hold the spring spacer 3 in the clearance L2 between the first turn 101 and the second turn 102 of the Ti spring 100. Thereby, mounting of the spring spacer 3 to the Ti spring 100 is made very easy.

Figure 15:
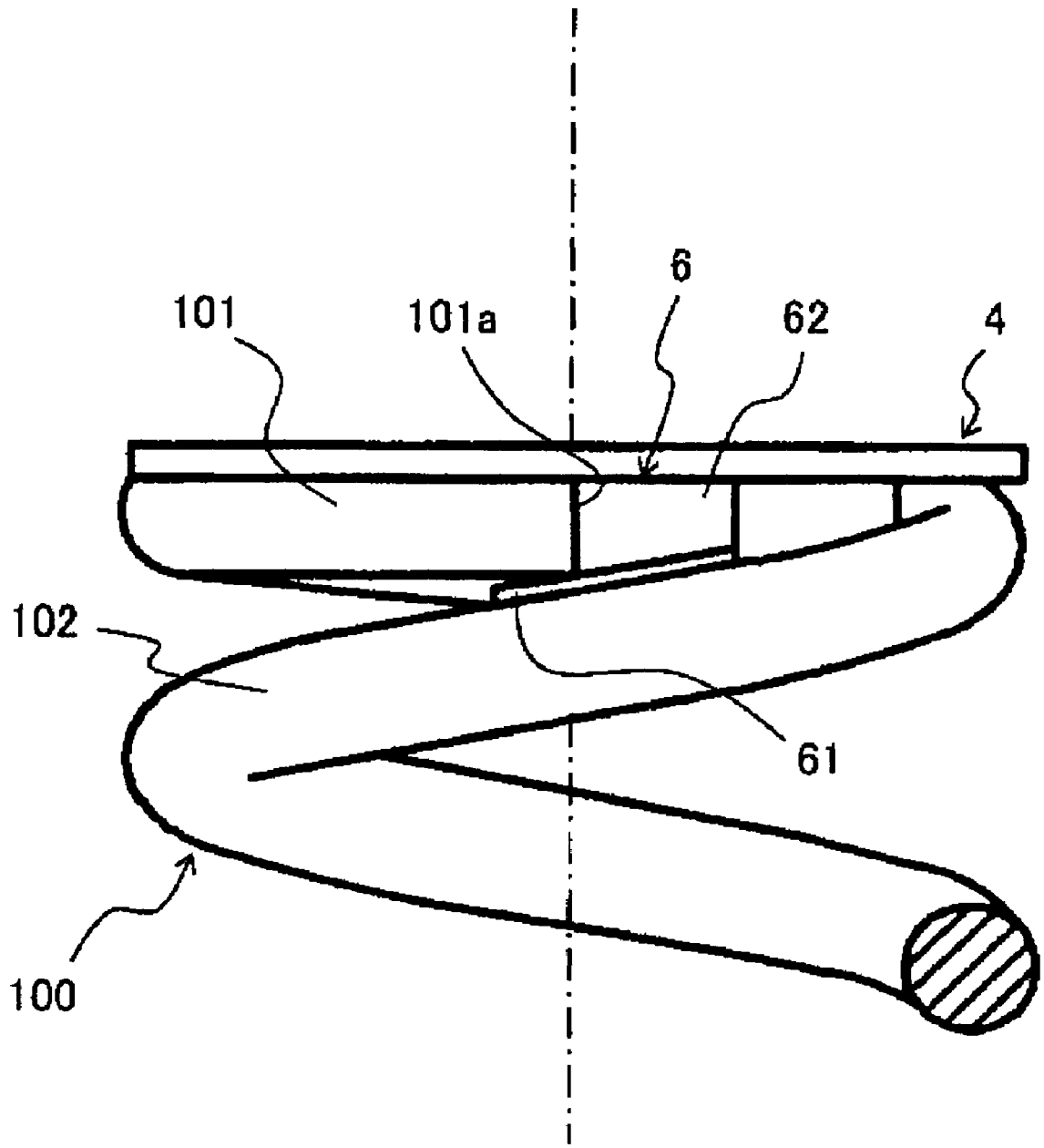
FIG. 15 is a front view of a spring spacer according to a fourth embodiment of the invention and mounted to the spring illustrated in FIG. 2B.

Subsequently, a spring spacer according to a fourth embodiment of the invention will be described with reference to FIG. 15. FIG. 15 is a front view showing a state, in which the spring spacer according to the fourth embodiment of the invention is mounted to the Ti spring.

In the figure, a spring spacer 6 according to the embodiment includes a first contact preventive portion 61 in the form of a thin sheet piece, and a second contact preventive portion (latch) 62 in the form of a block, which portions are molded from a synthetic resin to be made integral. According to the embodiment, the spring spacer 6 includes a holding portion made of an adhesive to bond the second contact preventive portion 62 to the trunk portion 4a and the flange portion 4b of the spring guide 4. Thereby, the first contact preventive portion 61 is held in the clearance between the first turn 101 and the second turn 102 of the Ti spring 100, and the second contact preventive portion 62 is held in a clearance between the spring guide 4 and the second turn 102.

In addition, the thickness of the second contact preventive portion 62 may be made larger than a dimension of that clearance between the spring guide 4 and the second turn 102 of the Ti spring 100, in which the second contact preventive portion 62 is mounted, and held in the clearance between the spring guide 4 and the second turn 102 by press fitting the second contact preventive portion 62 there between.

Like the respective embodiments, with such construction, the first contact preventive portion 61 of the spring spacer 6 is interposed between the first turn 101 and the second turn 102 of the Ti spring 100 to enable preventing the end 101a of the first turn 101 from contacting with the second turn 102. Also, since only the spring spacer 6 is formed from the synthetic resin and the spring guide 4 is formed from metal, the spring guide 4 can posses durability for a very large load of the Ti spring 100.

Figure 16:
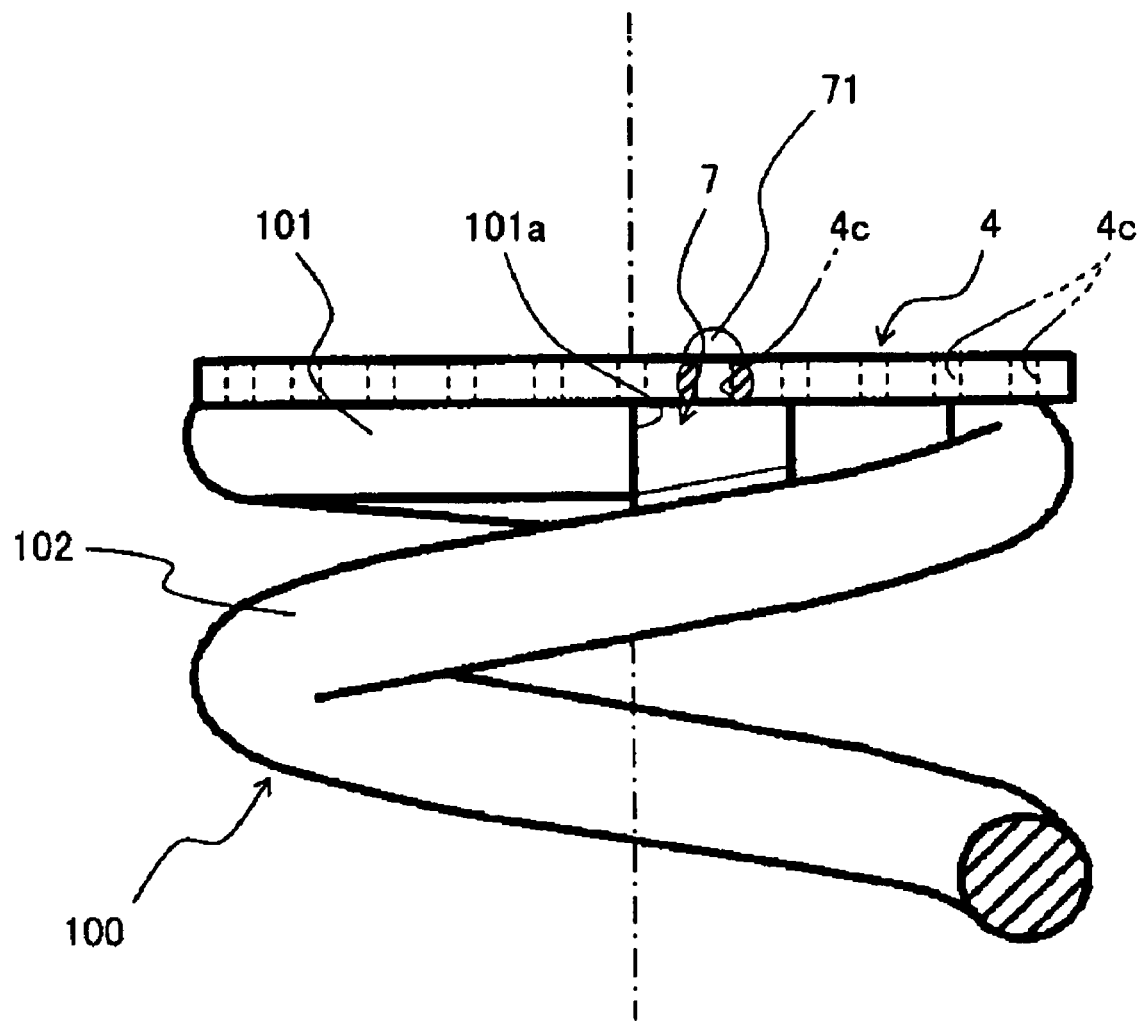
FIG. 16 is a front view of a spring spacer according to a fifth embodiment of the invention and mounted to the spring illustrated in FIG. 2B.

Subsequently, a spring spacer according to a fifth embodiment of the invention will be described with reference to FIG. 16. FIG. 16 is a front view showing a state, in which the spring spacer according to the fifth embodiment of the invention is mounted to the Ti spring.

In the figure, a spring spacer 7 according to the embodiment includes a block-shaped member molded from a synthetic resin, and separated from and independent of a metallic spring guide 4 that holds the first turn 101 of the Ti spring 100. An engagement projection 71 serving as a holding portion is molded on an upper surface of the spring spacer 7. On the other hand, a multiplicity of engagement holes 4c, 4c, etc. are drilled on the flange portion (spring bearing surface) 4b of the spring guide 4 to extend along a circumference thereof. By engaging the engagement projection 71 with any one of the engagement holes 4c, the spring spacer 7 is held in the clearance between the spring guide 4 and the second turn 102 of the Ti spring 100.

Like the respective embodiments, such structure causes the spring spacer 7 to interpose between the spring guide 4 and the second turn 102 of the Ti spring 100 to enable preventing the end 101a of the first turn 101 from contacting with the second turn 102.

Also, an optimum engagement hole 4c out of the multiplicity of engagement holes 4c, 4c, etc. drilled on the flange portion 4b of the spring guide 4 is selected to make it possible to mount the spring spacer 7 in an optimum position. Further, since only the spring spacer 6 is formed from the synthetic resin and the spring guide 4 is formed from metal, the spring guide 4 can posses durability for a very large load of the Ti spring 100.

Figure 17:
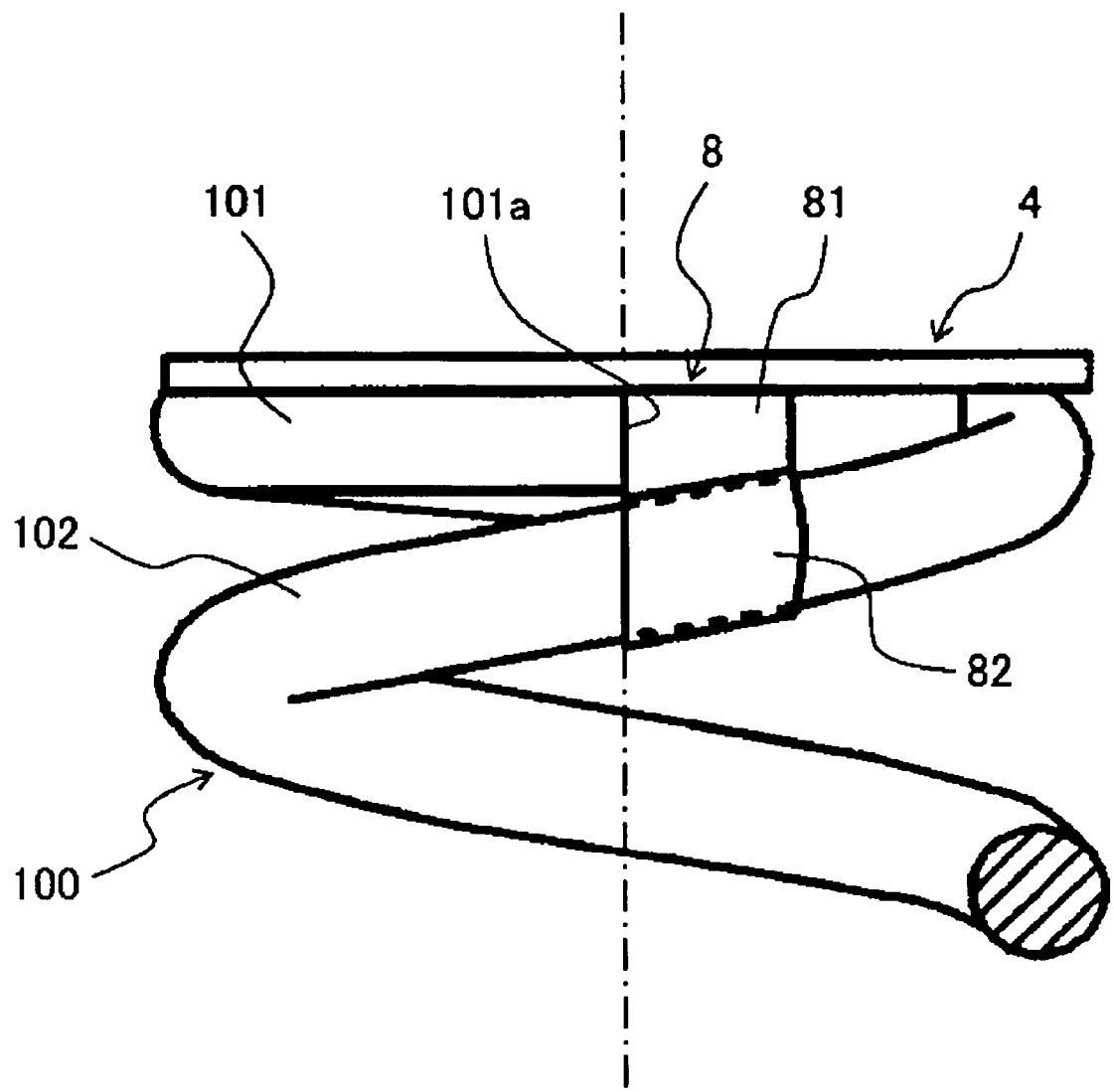
FIG. 17 is a front view of a spring spacer according to a sixth embodiment of the invention and mounted to the spring illustrated in FIG. 2B.

Subsequently, a spring spacer according to a sixth embodiment of the invention will be described with reference to FIG. 17. FIG. 17 is a front view showing a state, in which the spring spacer according to the sixth embodiment of the invention is mounted to the Ti spring.

In the figure, a spring spacer 8 according to the embodiment includes a block-shaped contact preventive portion 81 and an elastic engagement piece 82 serving as a holding portion, the contact preventive portion and the elastic engagement piece being molded from a synthetic resin to be made integral. The contact preventive portion 81 is structured in substantially the same manner as in the spring spacer 7 according to the sixth embodiment. On the other hand, the elastic engagement piece 82 is made arcuate to elastically hold the inner peripheral surface of the second turn 102 of the Ti spring 100.

Also, an inner peripheral surface of the elastic engagement piece 82 is a little smaller in radius of curvature than the inner peripheral surface of the second turn 102 of the Ti spring 100, so that even in the case where a dimensional error appears in the diameter of the second turn 102, a sufficient holding force is obtained.

Like the respective embodiments, such structure causes the spring spacer 8 to interpose between the spring guide 4 and the second turn 102 of the Ti spring 100 to enable preventing the end 101a of the first turn 101 from contacting with the second turn 102.

Also, the elastic engagement piece 82 serving as a holding portion is shaped not to contact with both the flange portion (spring bearing surface) 4b of the spring guide 4 and the Ti spring 100 all the time. Thereby, it is possible to mount the spring spacer 1 to the Ti spring 100 at any time irrespective of before and after the Ti spring 100 is mounted to the suspension unit 214.

Further, since only the spring spacer 8 is formed from a synthetic resin and the spring guide 4 is formed from metal, the spring guide 4 can posses durability for a very large load of the Ti spring 100.

Besides, with the spring spacer 8 according to the embodiment, by elastically engaging the elastic engagement piece 82 with the inner peripheral surface of the second turn 102 of the Ti spring 100, it is possible to stably hold the spring spacer 8 between the spring guide 4 and the second turn 102 of the Ti spring 100. Thereby, mounting of the spring spacer 8 to the Ti spring 100 is made very easy.

Figure 18:
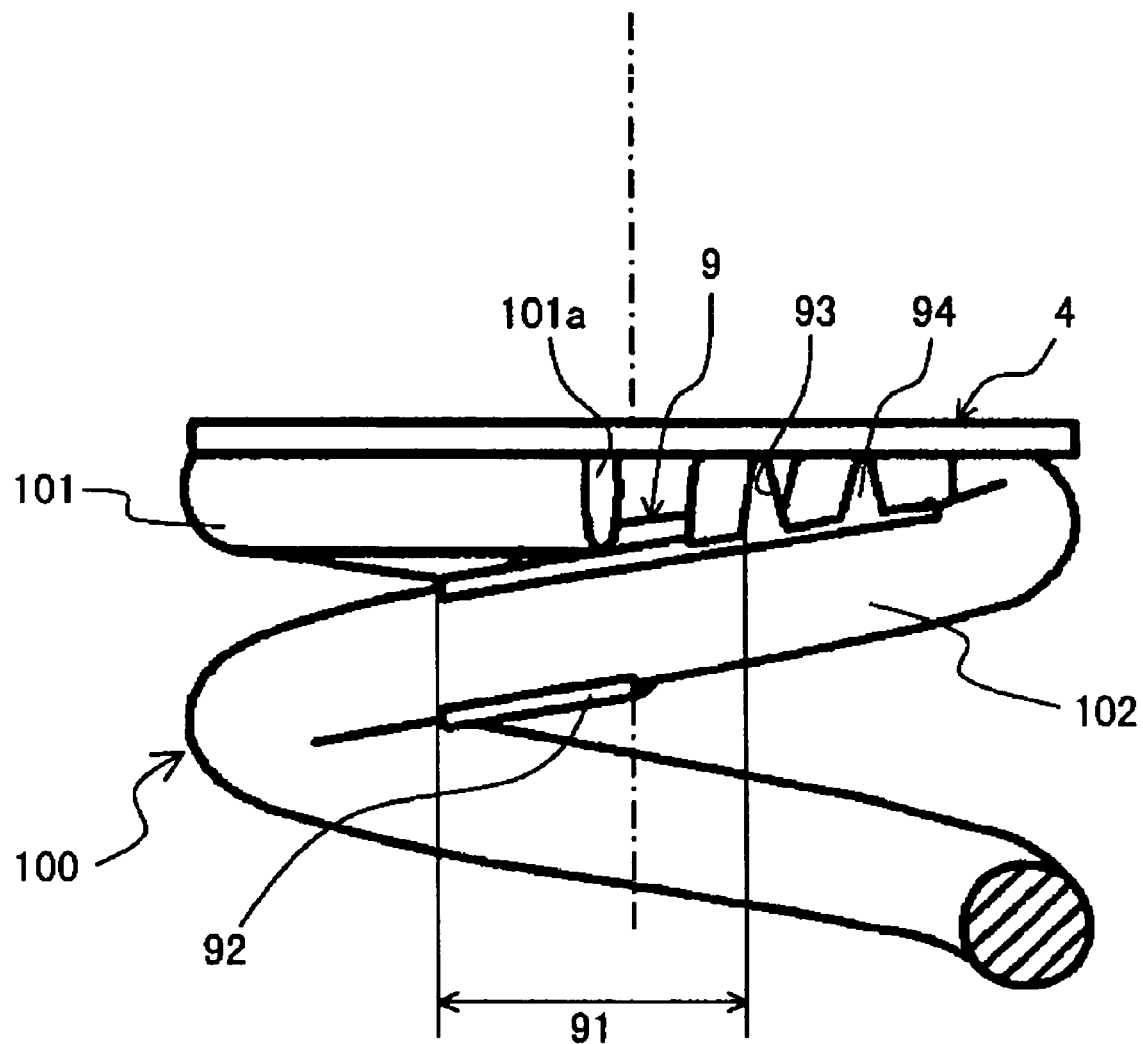
FIG. 18 is a front view of a spring spacer according to a seventh embodiment of the invention and mounted to the spring illustrated in FIG. 2B.

Subsequently, a spring spacer according to a seventh embodiment of the invention will be described with reference to FIG. 18. FIG. 18 is a front view showing a state, in which the spring spacer according to the seventh embodiment of the invention is mounted to the Ti spring.

In the figure, a spring spacer 9 according to the embodiment includes an elastic engagement piece (holding member) 92 formed contiguous to a side of a plate-shaped contact preventive portion 91 to extend downward to bend outward, and latches 93, 94 provided protrusively at a predetermined interval on a tip end side of the contact preventive portion 91 to be similar to those in the second and third embodiments.

Hereupon, with the spring spacer 9 according to the embodiment, the contact preventive portion 91 is made lengthy to interpose between the first turn 101 and the second turn 102 of the Ti spring 100 even in the case where the contact preventive portion 91 is moved along the Ti spring 100, thus preventing the end 101a of the first turn 101 from contacting with the second turn 102.

It is assumed that a spacing between the spring guide 4 and the second turn 102 of the Ti spring 100 becomes larger than a height of the latches 93, 94 due to a dimensional error of the Ti spring 100. In such case, even when the contact preventive portion 91 is moved along the Ti spring 100, the spring spacer 9 according to the embodiment enables the contact preventive portion 91 to interpose between the first turn 101 and the second turn 102 of the Ti spring 100 all the time. Thereby, it is possible to surely prevent the end 101a of the first turn 101 of the Ti spring 100 from contacting with the second turn 102.

In addition, the invention is not limited to the spring spacers, suspension springs, suspension units, and vehicles according to the respective embodiments. For example, a spring, to which the spring spacer according to the invention is applied, is not limited to the Ti spring but can prevent abrasion of a spring, which is not made of Ti and low in surface hardness. Also, the spring spacer according to the invention can be applied to a spring, which is large to some extent and intended for other uses than a use for suspension, and also applied to other devices than suspension units.

Also, while the embodiments have been described with respect to the case where the spring spacer according to the invention is interposed between a first turn and a second turn of a suspension spring of a motorcycle, they are not limited to a motorcycle. "Vehicle", to which the present spring spacer is applicable, includes motorcycles and automobiles. Stated in detail, "motorcycle" means a motorcycle and includes bicycles with a motor (motorbike) and scooters, "motorcycle" specifically meaning a vehicle capable of turning with a vehicle body inclined. Accordingly, included in "motorcycle" is a vehicle, of which at least one of a front wheel and a rear wheel is made two or more in number and which belongs to tricycles, four-wheel cars (or more) in terms of the number of tires. Further, the present spring spacer is applicable to a so-called saddle-ride type vehicle, such as snowmobile, four-wheel buggy (ATV: All Terrain Vehicle), etc., in addition to "motorcycle".

Further, while the embodiments have been described with respect to a construction, in which the spring spacer according to the invention is interposed between a first turn and a second turn of a Ti spring, it is not limited thereto but the spring spacer is preferably interposed between first turns and second turns at both ends of the Ti spring.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A spring spacer comprising:
   a contact preventive portion that prevents an end of a first turn of a spring, both ends of the spring being held on spring bearing surfaces, from contacting with a second turn;
   a holding portion that holds the contact preventive portion on the spring or the spring bearing surface, the holding portion being sized so as not to contact both the spring and the spring bearing surface at least when the spring is un-contracted;
   wherein the thickness of the contact preventive portion is made smaller than a dimension of that clearance between the first turn and the second turn of the spring, in which the contact preventive portion is mounted.

2. The spring spacer according to claim 1, wherein the contact preventive portion is interposed between the first turn and the second turn of the spring to prevent the end of the first turn from contacting the second turn.

3. The spring spacer according to claim 1, wherein the contact preventive portion is interposed between the spring bearing surface and the spring to prevent the end of the first turn from contacting the second turn.

4. The spring spacer according to claim 1 additionally comprising another contact preventive portion that is interposed between the first turn and the second turn of the spring to prevent the end of the first turn from contacting the second turn, and wherein the other contact preventive portion is interposed between the spring bearing surface and the spring to prevent the end of the first turn from contacting the second turn.

5. The spring spacer according to claim 1 additionally comprising a latch that is interposed between the spring bearing surface and the spring to prevent the contact preventive portion from moving along the spring, and the contact preventive portion being interposed between the first turn and the second turn of the spring to prevent the end of the first turn from contacting the second turn.

6. The spring spacer according to claim 5, wherein the latch comprises one or more piece members susceptible to deformation upon application of a load from above.

7. The spring spacer according to claim 1, wherein the portion of the contact preventive portion, which corresponds to the end of the first turn, is made smaller in thickness than the remaining portion of the contact prevention portion.

8. The spring spacer according to claim 1, wherein the holding portion comprises an elastic engagement piece provided on the contact preventive portion and the spring is held by the elastic engagement piece to hold the contact preventive portion between the first turn and the second turn of the spring, or between the spring bearing surface and the spring.

9. The spring spacer according to claim 1, wherein the holding portion comprises an adhesive to bond and fix the contact preventive portion to the spring bearing surface to hold the same between the spring bearing surface and the spring.

10. The spring spacer according to claim 1, wherein the holding portion comprises an engagement projection provided on the contact preventive portion and the contact preventive portion is held between the spring bearing surface and the spring by engaging the engagement projection with an engagement hole formed on the spring bearing surface.

11. The spring spacer according to claim 1, wherein the contact preventive portion is curved to have substantially the same radius of curvature as that of the second turn of the spring.

12. The spring spacer according to claim 1, wherein the contact preventive portion is made of sufficient length so as to be interposed between the first turn and the second turn of the spring even in the case where the contact preventive portion is moved along the spring, thus preventing the end of the first turn from contacting with the second turn.

13. The spring spacer according to claim 1, wherein the holding portion is configured to hold the contact preventive portion directly on the spring or the spring bearing surface.

14. The spring spacer according to claim 1, wherein the holding portion is configured to hold the contact preventive portion indirectly on the spring or the spring bearing surface.

15. A spring having the spring spacer according to claim 1, the spring spacer being interposed between a first turn and a second turn, or between the spring bearing surface and the second turn, or between the both.

16. A suspension spring having the spring spacer according claim 1, the spring spacer being interposed between a first turn and a second turn, or between the spring bearing surface and the second turn, or between the both.

17. A unit having the spring spacer according to claim 1, the spring spacer being interposed between a first turn and a second turn of a spring, or between the spring guide and the second turn, or between the both.

18. A suspension unit having the spring spacer according to claim 1, the spring spacer being interposed between a first turn and a second turn of a suspension spring, or between the spring guide and the second turn, or between the both.

19. A vehicle provided with a suspension unit having the spring spacer according to claim 1, the spring spacer being interposed between a first turn and a second turn of a suspension spring, or between the spring guide and the second turn, or between the both.

20. A spring spacer comprising:
a contact preventive portion that prevents an end of a first turn of a spring, both ends of the spring being held on spring bearing surfaces, from contacting with a second turn;
a holding portion that holds the contact preventive portion on the spring or the spring bearing surface, the holding portion being sized so as not to contact both the spring and the spring bearing surface at least when the spring is un-contracted;
wherein the holding portion comprises an abutment piece formed on one side of the contact preventive portion to abut against at least an inner peripheral surface of the second turn of the spring and the abutment piece is caused to abut against an outer peripheral surface of a cylindrical-shaped member inserted into the spring to thereby hold the contact preventive portion between the first turn and the second turn of the spring, or between the spring bearing surface and the spring.

21. The spring spacer according to claim 20, wherein the thickness of the contact preventive portion is made larger than a dimension of that clearance between the first turn and the second turn of the spring, in which the contact preventive portion is mounted,
the holding portion comprises latch grooves, which are formed on two surfaces of the contact preventive portion and arcuate in cross section to correspond to outer peripheral surfaces of the first turn and the second turn of the spring, and
the contact preventive portion is press fitted and held between the first turn and the second turn of the spring.

22. A spring spacer comprising:
a contact preventive portion that prevents an end of a first turn of a spring, both ends of the spring being held on spring bearing surfaces, from contacting with a second turn;
a holding portion that holds the contact preventive portion on the spring or the spring bearing surface, the holding portion being sized so as not to contact both the spring and the spring bearing surface at least when the spring is un-contracted;
wherein the contact preventive portion comprises a first surface shaped complimentary to an outer surface of the end of the first turn and a second surface shaped complimentary to an outer surface of the second turn, the first and second surfaces being arranged such that both the first and second surfaces do not contact both the outer surfaces of the end of the first turn and the second turn when the spring is un-contracted.

* * * * *

UNITED STATES PATENT AND TRADEMARK OFFICE
CERTIFICATE OF CORRECTION

PATENT NO. : 7,527,252 B2  Page 1 of 1
APPLICATION NO. : 11/303436
DATED : May 5, 2009
INVENTOR(S) : Satoshi Oohashi It is certified that error appears in the above-identified patent and that said Letters Patent is hereby corrected as shown below:

Title Page, Column 2 (Item 56), Line 6, under U.S. Patent Documents, please change "7,213,067" to --7,213,802--.

In Column 14, Line 28 (Approx.), please change "4cout" to --4c out--.

Signed and Sealed this

Twenty-seventh Day of April, 2010

David J. Kappos
*Director of the United States Patent and Trademark Office*